(12) United States Patent
Kundem et al.

(10) Patent No.: US 12,521,740 B2
(45) Date of Patent: Jan. 13, 2026

(54) PORTABLE LOW-PRESSURE AIRLESS SPRAYER

(71) Applicant: Wagner Spray Tech Corporation, Plymouth, MN (US)

(72) Inventors: Jeshwanth Durga Sagar Kundem, Minneapolis, MN (US); Brian Lee Fideler, Jordan, MN (US); Joseph W. Kieffer, Chanhassen, MN (US); Thomas Jeltsch, Friedrichshafen (DE); Mujo Taletovic, Immenstaad (DE)

(73) Assignee: Wagner Spray Tech Corporation, Plymouth, MN (US)

( * ) Notice: Subject to any disclaimer, the term of this patent is extended or adjusted under 35 U.S.C. 154(b) by 766 days.

(21) Appl. No.: 17/124,889

(22) Filed: Dec. 17, 2020

(65) Prior Publication Data

US 2021/0187526 A1    Jun. 24, 2021

Related U.S. Application Data

(60) Provisional application No. 62/952,817, filed on Dec. 23, 2019.

(51) Int. Cl.
*B05B 7/04* (2006.01)
*B01F 33/84* (2022.01)
(Continued)

(52) U.S. Cl.
CPC ........ *B05B 7/0408* (2013.01); *B01F 33/8442* (2022.01); *B01F 33/846* (2022.01);
(Continued)

(58) Field of Classification Search
CPC ... B05B 7/0408; B05B 9/0833; B05B 12/002; B05B 12/008; B05B 12/1409;
(Continued)

(56) References Cited

U.S. PATENT DOCUMENTS

| 3,135,467 A | 6/1964 | Leo |
|---|---|---|
| 4,526,191 A | 7/1985 | Pomponi, Jr. |

(Continued)

FOREIGN PATENT DOCUMENTS

| CN | 204974274 U | 1/2016 |
|---|---|---|
| CN | 106998875 A | 8/2017 |

(Continued)

OTHER PUBLICATIONS

International Preliminary Report on Patentability for International Patent Application No. PCT/US2020/065961, mailing date of: Jul. 7, 2022, filing date of: Dec. 18, 2020, 9 pages.

(Continued)

*Primary Examiner* — Chee-Chong Lee

(74) *Attorney, Agent, or Firm* — Christopher J. Volkmann; KELLY, HOLT & CHRISTENSON PLLC

(57) ABSTRACT

A handheld portable spraying system includes a fluid source having a plurality of different fluids and a fluid container configured to separately contain the plurality of different fluids. The handheld portable spraying system also includes a fluid pathway configured to carry the plurality of different fluids from the fluid source through an outlet of the handheld portable spraying system, and a fluid conveyance system configured to cause the plurality of different fluids to flow along the fluid pathway. The handheld portable spraying system further includes a controller configured to generate a control signal to control the flow of the plurality of different fluids along the fluid pathway.

22 Claims, 21 Drawing Sheets

(51) Int. Cl.
*B05B 9/08* (2006.01)
*B05B 12/00* (2018.01)
*B05B 12/14* (2006.01)
*B05B 9/00* (2006.01)
*G01J 3/46* (2006.01)

(52) U.S. Cl.
CPC .......... *B05B 9/0833* (2013.01); *B05B 12/002* (2013.01); *B05B 12/008* (2013.01); *B05B 12/1409* (2013.01); *B05B 12/1418* (2013.01); *B05B 9/007* (2013.01); *B05B 9/0861* (2013.01); *G01J 3/463* (2013.01)

(58) Field of Classification Search
CPC ... B05B 12/1418; B05B 9/007; B05B 9/0861; B01F 33/8442; B01F 33/846; G01J 3/463
USPC ........................................................ 239/526
See application file for complete search history.

(56) References Cited

U.S. PATENT DOCUMENTS

| | | | |
|---|---|---|---|
| 4,948,042 A | 8/1990 | Tench et al. | |
| 5,812,903 A * | 9/1998 | Yamada | G03G 15/0855 399/60 |
| 5,822,079 A * | 10/1998 | Okuno | G03G 15/5041 358/300 |
| 5,967,044 A * | 10/1999 | Marschke | B41F 31/08 101/366 |
| 6,052,195 A * | 4/2000 | Mestha | G01J 3/463 356/402 |
| 6,390,662 B1 | 5/2002 | Henry et al. | |
| 6,940,597 B2 | 9/2005 | Taylor et al. | |
| 7,705,056 B1 * | 4/2010 | Carnahan | C09J 11/00 521/910 |
| 7,804,597 B2 | 9/2010 | De Haas et al. | |
| 8,885,934 B2 | 11/2014 | Lings et al. | |
| 9,135,886 B2 | 9/2015 | Kirchner et al. | |
| 9,149,824 B2 * | 10/2015 | Drozd | B05B 9/04 |
| 9,791,318 B2 | 10/2017 | Kirchner et al. | |
| 10,152,494 B2 | 12/2018 | Thomas et al. | |
| 10,375,148 B2 | 8/2019 | Kirchner et al. | |
| 10,830,644 B2 | 11/2020 | Craighead et al. | |
| 11,900,507 B2 | 2/2024 | Vlot et al. | |
| 2003/0180442 A1 | 9/2003 | Hopson | |
| 2008/0230630 A1 | 9/2008 | Charpie | |
| 2011/0045175 A1 | 2/2011 | Nielsen et al. | |
| 2011/0085169 A1 | 4/2011 | Craighead et al. | |
| 2011/0163174 A1 | 7/2011 | Karunaratne et al. | |
| 2012/0113244 A1 * | 5/2012 | Nielsen | G06T 7/90 348/82 |
| 2013/0269807 A1 | 10/2013 | Drozd et al. | |

FOREIGN PATENT DOCUMENTS

| | | |
|---|---|---|
| CN | 108698056 A | 10/2018 |
| KR | 10-1844177 B1 | 3/2018 |
| WO | 2004110643 A1 | 12/2004 |
| WO | 2016127106 A1 | 8/2016 |
| WO | WO 2021/001310 A1 | 1/2021 |
| WO | WO 2021209413 A1 | 10/2021 |
| WO | 2023041596 A1 | 3/2023 |
| WO | 2024013027 A1 | 1/2024 |

OTHER PUBLICATIONS

"AkzoNobel on LinkedIn: Taking color to another dimension with 2D applications" retrieved at: <<https://www.linkedin.com/posts/akzonobel_akzonobel-color-passionforpaint-ugcPost-6651342395906510848-kiwZ>>, retrieved on: Feb. 13, 2023, 25 pages.
International Search Report and Written Opinion for International Patent Application No. PCT/US2020/065961 mailing date of Apr. 8, 2021, filing date of Dec. 18, 2020, 12 pages.
First Office Action for Chinese Application No. 202080089237.5, dated Jan. 29, 2024, 22 pages including English translation.
European Search Report for Application No. 20907044.0, dated Feb. 2, 2024, 10 pages.
First Office Action for Chinese Patent Application No. 202080089237.5 dated Jan. 29, 2024, 11 pages.
Second Office Action for Chinese Patent Application No. 202080089237.5 dated Jul. 22, 2024, 10 pages.
CN 202080089237.5—Rejection Decision, dated Dec. 23, 2024, 35 pages.
CN 202080089237.5—Third Office Action, dated Oct. 18, 2024, 27 pages.

* cited by examiner

PORTABLE LOW-PRESSURE AIRLESS SPRAYER

CROSS-REFERENCE TO RELATED APPLICATION

The present application is based on and claims the benefit of U.S. provisional patent application Ser. No. 62/952,817, filed on Dec. 23, 2019, the contents of which are hereby incorporated by reference in their entirety.

BACKGROUND

In a typical fluid spraying system, a fluid applicator is fluidically coupled to a source of fluid and is configured to apply the fluid to a surface. In some cases, the fluid includes substances composed of coloring matter or pigment.

The discussion above is merely provided for general background information and is not intended to be used as an aid in determining the scope of the claimed subject matter. The claimed subject matter is not limited to implementations that solve any or all disadvantages noted in the background.

SUMMARY

A handheld portable spraying system includes a fluid source having a plurality of different fluids and a fluid container configured to separately contain the plurality of different fluids. The handheld portable spraying system also includes a fluid pathway configured to carry the plurality of different fluids from the fluid source through an outlet of the handheld portable spraying system, and a fluid conveyance system configured to cause the plurality of different fluids to flow along the fluid pathway. The handheld portable spraying system further includes a controller configured to generate a control signal to control the flow of the plurality of different fluids along the fluid pathway.

This summary is provided to introduce a selection of concepts in a simplified form that are further described below in the Detailed Description. This summary is not intended to identify key features or essential features of the claimed subject matter, is not intended to describe each disclosed example or every implementation of the claimed subject matter and is not intended to be used as an aid in determining the scope of the claimed subject matter. Many other novel advantages, features, and relationships will become apparent as this description proceeds. The figures and the description that follow more particularly exemplify illustrative examples.

Figure 1A:
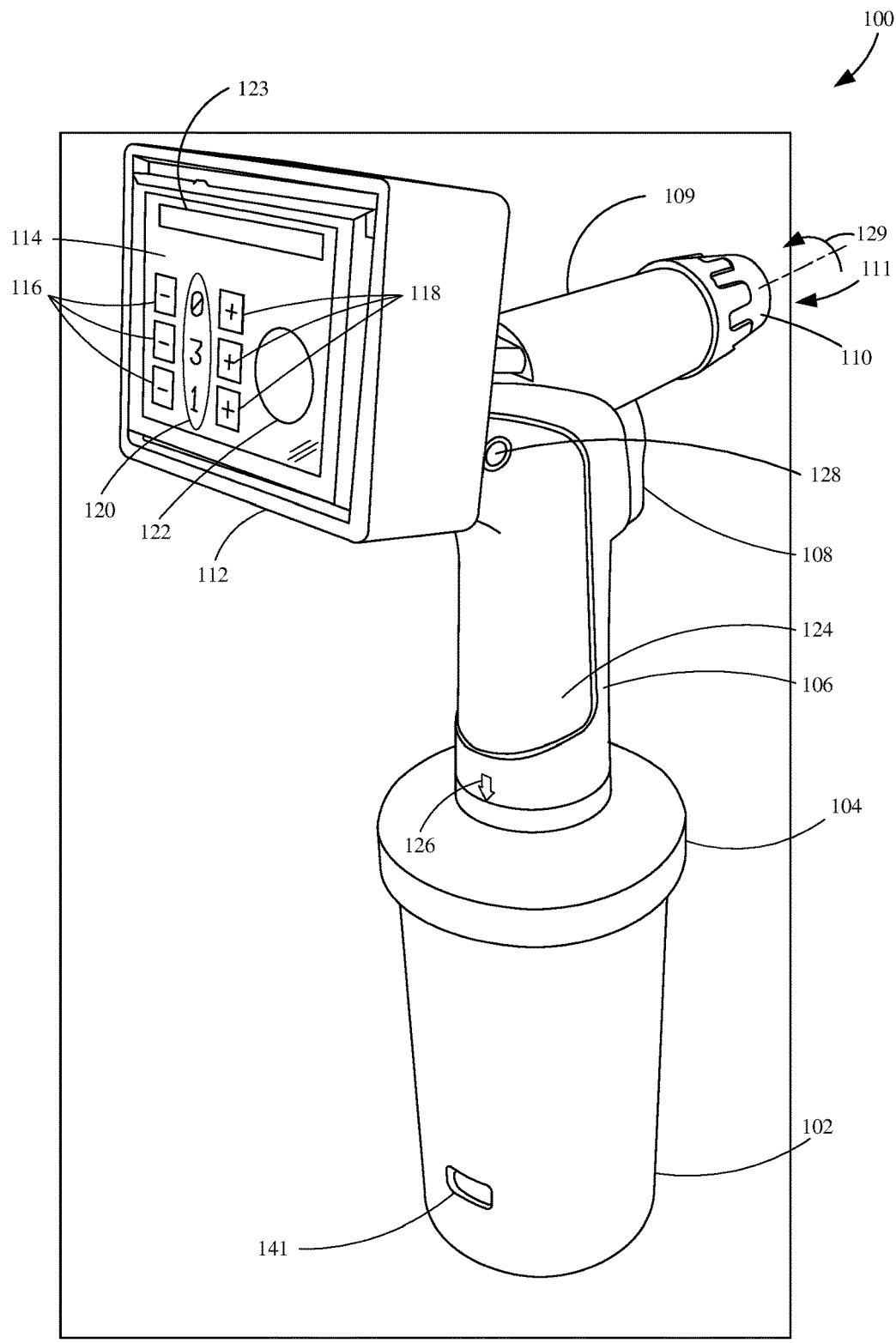
FIG. 1A is a perspective view showing one example of a spraying system.

While the above-identified figures set forth one or more examples of the disclosed subject matter, other examples are also contemplated, as noted in the disclosure. In all cases, this disclosure presents the disclosed subject matter by way of representation and not limitation. It should be understood that numerous other modifications and examples can be devised by those skilled in the art which fall within the scope and spirit of the principles of this disclosure.

DETAILED DESCRIPTION

There are a wide variety of fluid spraying systems. For example, a typical airless sprayer sprays fluid from a fluid source (e.g., 5-gallon paint bucket) at a very high pressure (e.g., up to approximately 3000 PSI), through a hose and out of a small opening or orifice in a spray gun tip. The tip is configured to break up the paint into a generally fan-shaped spray pattern of tiny droplets (e.g., atomization). In some airless sprayers, different tips can be used to accommodate different liquids, as well as to adjust the spray pattern, directionality, etc. To operate at the high pressure, some airless sprayer systems require a separate motor and pump assembly (usually carried on a cart) delivering pressurized fluid to the spray gun through a line extending from motor and pump assembly to a fitting on the gun. Additionally, the high pressure at which the fluid is pressurized requires that components of the spraying system be configured to withstand the high pressure, typically requiring more robust materials. While these high-pressure systems allow for a wide variety of fluids to be sprayed, the system requirements can add additional cost as well as limit the mobility of the system. Furthermore, the high pressure can increase material waste (such as from overspray) and can be difficult for a user to properly operate, particularly an inexperienced user.

Other types of spraying systems exist. For example, a high-volume low pressure (HVLP) spraying system generally seeks to reduce the drawbacks associated with a high-pressure spraying system by propelling fluid from a fluid source with a high volume of air at a lower pressure. This can reduce, for example, the amount of material waste, as well as the size and requirements for the system and can be easier for a user to operate. However, even for these HVLP systems, a separate assembly (e.g., an air compressor) is generally required which can add cost and limit portability. Furthermore, the materials must still be robust enough to handle the high volume of compressed air. These requirements can impose a cost that can be prohibitive to some users or for use in some fluid application operations.

Additionally, the fluid (e.g., paint) used in a high pressure and/or high-volume low-pressure system is typically pre-mixed (or pre-pigmented) off-site at, for example, various fluid vendors. The user can select from a variety of color options that the vendor offers, or in some cases, can bring in a sample color for the vendor to try and match. In any case, there is an added expense and inconvenience of having to leave the jobsite to resupply and/or go to a vendor ahead of time in preparation for a job. Additionally, once the fluid is mixed it is difficult to adjust the color, especially without additional expense and/or inconvenience.

Less expensive and more convenient (in some ways) alternatives exist. For example, spray paint cans (e.g., aerosol cans) can come in a variety of colors and are relatively inexpensive as compared to a can/bucket of paint. However, spray paint cans can release pollutants into the environment. Additionally, the pounds per square inch (PSI) output (e.g., approximately 100 PSI) of typical spray paint cans can be well below the required PSI output to spray (or spray desirably) higher quality paints (e.g., thicker paints) as well as certain other fluids.

In some examples described herein, a portable handheld airless spraying system operates at significantly lower pressures than typical airless spraying systems and with high atomization rates. In one example, the spraying system comprises a spray gun having an onboard fluid source that can be pressurized at an operating pressure suitable to spray a variety of fluids, including higher quality paints. In one example, the onboard fluid source can be pressurized at a pressure lower than typical airless sprayers (e.g., less than approximately 3000 PSI) and higher than typical aerosol spraying systems (e.g., more than approximately 100 PSI). In one example, the spraying system can pressurize the onboard fluid source at a range of 100 PSI to 1000 PSI. In one example, the fluid is pressurized by a liquified gas contained within a pressure vessel. For instance, but not limited to, a replaceable Carbon Dioxide ($CO_2$) cannister that applies pressure to a fluid container (e.g., a collapsible bag, bladder, etc.) at approximately 700-800 PSI. In some examples, the handheld spraying system is provided with an electronics assembly having, for example, but not limited to, processor(s)/controller(s), an interactive display (e.g., touchscreen) which can include a variety of user input mechanisms and/or display elements, as well as a variety of other items (e.g., sensors, various logic, and circuitry, etc.). The processor(s)/controller(s) and/or interactive display can, in some examples, allow a user to control, modify, adjust, etc. a variety of characteristics, parameters, etc. relative to the spraying system, for example, but not limited to, a ratio, flow rate, volume, etc. of fluid(s) from the fluid source, the operating pressure, etc.

Additionally, in further examples, the handheld spraying system includes a fluid source having multiple fluid compartments, the flow from which can be controlled (e.g., automatically by a control system, manually by a user, etc.) to desirably control a mixture of fluid to be sprayed by the spraying system. In some examples, the multiple fluid compartments are configured to contain different fluids (e.g., differently colored/pigmented paints). Further examples provide the handheld spraying system with a color matching system configured to match a preprogrammed, user selected, and/or automatically determined (e.g., via sensors and processing) color by controllably conveying fluid(s) from fluid source(s) to generate a desirably mixed fluid. In some examples, the color matching system includes a color sensor, which can be coupled to the handheld spraying system (e.g., electronically, physically, and/or communicatively, etc.) which can sense a surface and generate a sensor signal indicative of a color of the surface. The color matching system can include various logic which, based upon the sensor signal, can determine a color of the surface and generate control/action signals to components of the spraying system (e.g., metering elements [valves, pumps, etc.], a fluid conveyance system [e.g., motor(s), pump(s), pressure vessel(s), etc.], etc.) to, for example, control the flow of fluid(s) from fluid source(s) to, for example, but not limited to, generate a fluid having a mixture configured to replicate the determined color, as well as to generate a variety of displays, indications, recommendations, etc. on the user interface.

FIG. 1A is a perspective view showing one example spraying system 100. As illustrated, spraying system 100 is a handheld, portable spray gun, although in other examples, spraying system 100 can comprise any number of other spraying systems. Spraying system 100 includes housing 102, housing cap 104, handle 106, trigger 108, gun body 109, spray tip 110, outlet 111, electronics assembly 112, display 114, actuators 116 and 118, display elements 120 and 122, grip portion 124, alignment indicator 126, fastener(s) 128, input/output port 141.

Housing 102 is configured to house various elements of spraying system 100 including, but not limited to, fluid source(s), fluid pathway(s), metering device(s), mixing chamber(s), fluid conveyance (e.g., motor(s), pump(s), pressure vessel(s)) various sensor(s), as well as a variety of other elements, as will be discussed further herein. For purposes of illustration, housing 102 will be discussed with regard to a fluid source, for example, containing fluid(s) and/or source(s) of fluid to be sprayed out of outlet 111. Housing 102 can be removably coupled to spraying system 100. For example, housing 102 can be removably coupled (e.g., threadably coupled) to housing cover 104. Housing cover 104 can be coupled to the bottom-end of handle 106. For example, but not by limitation, housing cover 104 can be fixably mounted to the bottom-end of handle 106 such that housing 102 can fasten or couple to housing cover 104 for installation of housing 102 onto spraying system 100. In another example, housing cover 104 can have an opening configured to allow a portion of handle 106 therethrough such that housing 102 is coupled to handle 106 and installed on spraying system 100. A proper alignment of handle 106 and housing 102 and/or housing cover 104 can be indicated by alignment indicator 126, illustratively shown as an arrow. In any case, fluid, contained within housing 102, is carried by a fluid pathway (upon actuation of trigger 108 for example) from housing 102, through handle 106 and gun body 109 through spray tip 110 and out of outlet 111.

Handle 106 can comprise a grip portion 124 that can comprise a different material than the remainder of handle 106 (or the rest of spraying system 100) and include surface geometry (e.g., ridges) such that it is easier for a user to operate spraying system 100. For example, grip portion 124 can comprise a slip-resistant (e.g., "grippier") material (e.g., rubber) and include surface geometry, such as ridges, such that a user's hand can more easily grasp and control spraying system 100. Handle 106 can be fastened or otherwise coupled to gun body 109 by fasteners 128, illustratively shown as a screw. Fasteners 128 can be recessed within the body of handle 106 to prevent tampering or loosening of fasteners 128 (e.g., by inadvertent contact with some object) and/or to prevent potentially dangerous contact with fasteners 128 (e.g., a user's hand being cut by screwhead). In some examples, handle 106 can also include a filter, fluid lines(s), metering device(s), mixing chamber(s), fluid conveyance (e.g., pressure vessel(s), motor(s), pump(s), etc.) as well as a variety of other components.

Gun body 109 can include internal mechanics (e.g., a valve) that are actuated by user actuation of trigger 108 such that fluid flows from housing 102 and out of outlet 111. Spray tip 110 is coupled to an end of gun body 109 and is configured to control the flow or pattern of spray of fluid as it exits outlet 111. Spray tip 110 can be adjustable such that the flow rate (e.g., volumetric flow rate) or spray pattern is adjustable. For example, a user can turn spray tip 110 in a clockwise or counterclockwise direction, as indicated by arrow 129. Additionally, spray tip 110 can be replaced with a different type of tip for a different spray pattern or to accommodate a different fluid, for example. In some examples, gun body 109 can also include a filter, fluid line(s), metering device(s), mixing chamber(s), fluid conveyance (e.g., pressure vessel(s), motor(s), pump(s), etc.) as well as a variety of other components.

Figure 1B:
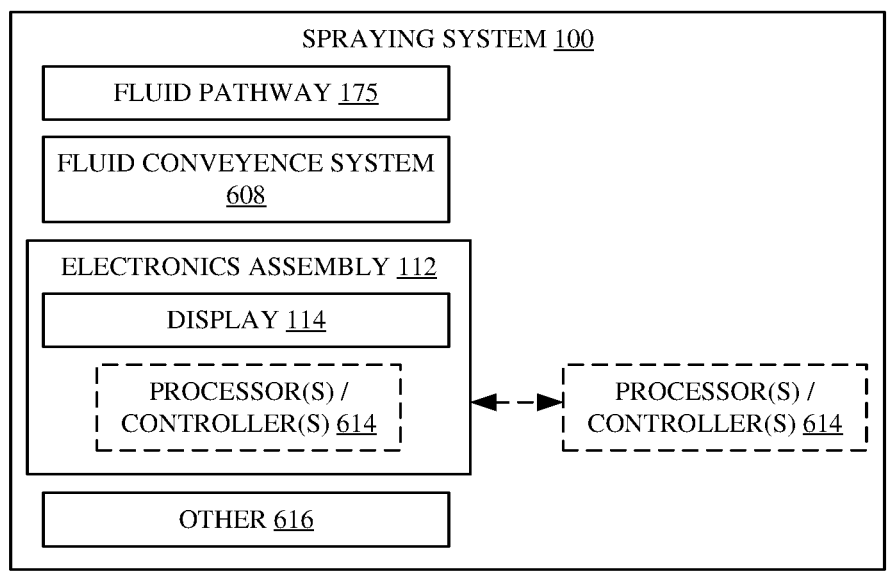
FIG. 1B is a block diagram showing one example of a spraying system.
Figure 2:
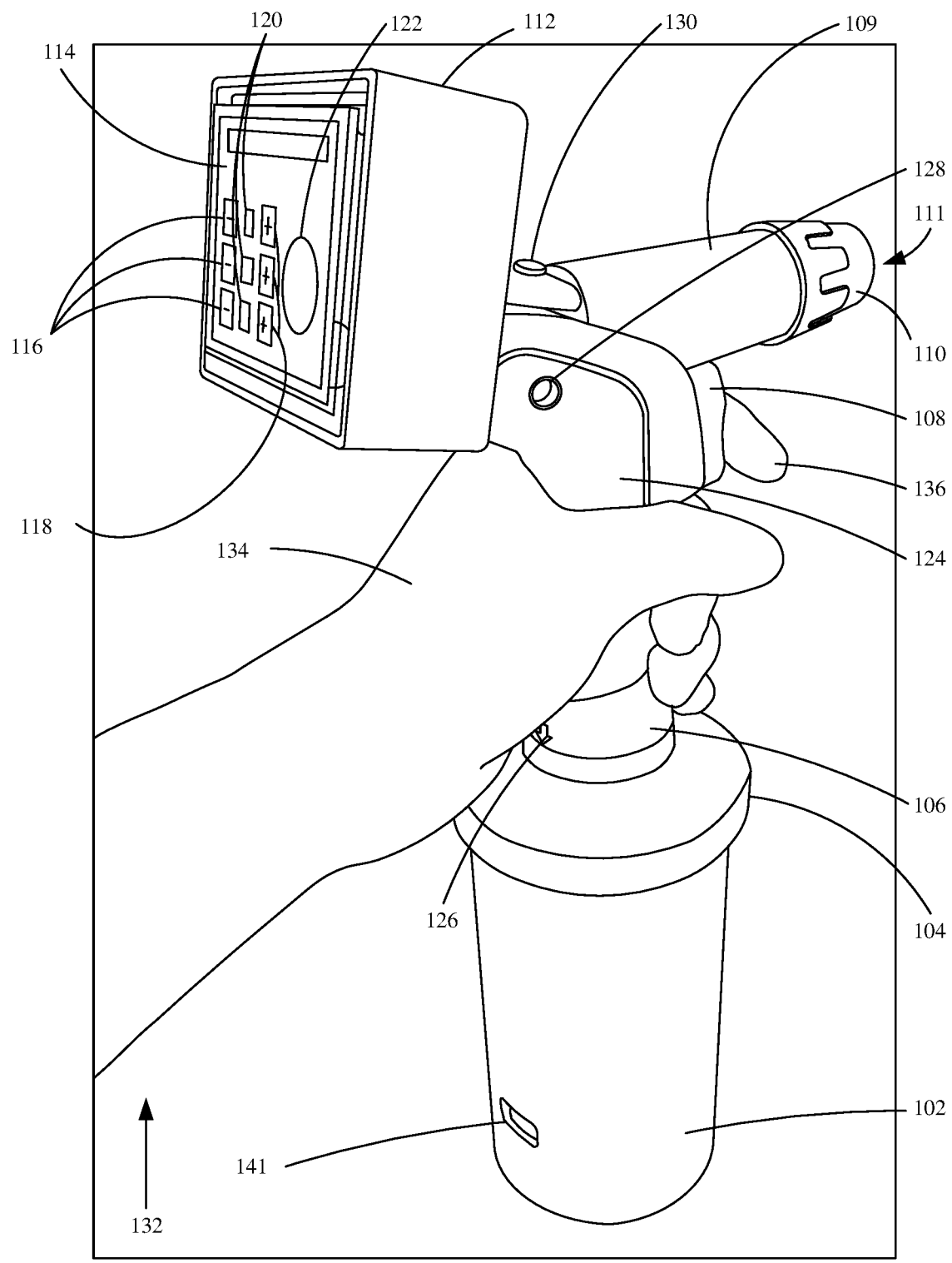
FIG. 2 is a perspective view showing one example of a spraying system operated by a user.

Electronics assembly 112 is coupled to spraying system 100, for example, by fasteners 130 (illustratively shown in FIG. 2 as a screw). Electronics assembly 112 can include a variety of components, including, but not limited to user interface(s) (e.g., display(s)), power source(s), controller(s)/processor(s), logic, circuitry, data stores (e.g., memory) as well as various other components. As shown in FIG. 1, electronics assembly 112 includes display 114, illustratively shown as an interactive display (e.g., a touchscreen). Display 114 can include a number of user input mechanisms and/or display elements. For example, but not limited to, any number of user input mechanisms to allow a user to control, modify, adjust etc. various characteristics, parameters, etc. of spraying system 100 (e.g., flow of fluids, operating pressure, etc.) as well as to interact with electronics assembly 112 and/or spraying system 100. Additionally, display 114 can include any number of display elements configured to display a variety of information, items, etc., for example, but not limited to, characteristics, parameters, etc. of spraying system 100 (e.g., operating pressure, battery life, remaining fluid, ratio, flow rate, volume, connectivity, etc.). Display 114 can include any number of other items as well.

As illustrated, display 114 includes user input mechanisms 116 and 118 and display elements 120, 122 and 123. User input mechanisms 116 and 118, illustratively shown as "+" and "−" buttons or other actuators, are user actuatable and configured to allow a user to, for example, adjust an operating parameter of spraying system 100. As shown in FIG. 1A, a corresponding display element 120 is displayed between each set of "+" "−" actuators 116 and 118. As shown, display elements 120 are "0", "3" and "1" respectively. Display element 122, illustratively shown as a color circle, indicates a preprogrammed, determined, and/or user selected color of fluid to be sprayed by spraying system 100. Display element 123, can display a variety of information. For example, display element 123 can be a textual display that indicates what the sum total of group display elements 120 (e.g., mixture requirements [ratio, flow rate, volume, etc.]) should be for the preprogrammed, determined, and/or user selected color of fluid as indicated by display element 122.

As an illustrative example, the color selected and/or sensed by spraying system 100 and indicated by display element 122 is a "lime-green". Display 114 indicates that, for a red-yellow-blue color palette, lime green should be 0 parts red, 3 parts yellow and 1 part blue (as indicated by display elements 120). A user can adjust the input of each color via user input mechanisms 116 and 118 (the input corresponding to a ratio, flow rate, volume, etc. of each colored fluid respectively). In any case, fluid can be drawn from housing 102 according to the desired mixture of fluid as indicated by display elements 120. It is to be understood that display 114 can include any number of display elements, user input mechanisms, as well as other items, including various menus and displays.

As shown in FIG. 1A, spraying system 100 can include an input/output port 141 (e.g., a USB port) configured to allow communicative coupling between components of spraying system 100 (e.g., electronics assembly 112, color sensor 150 shown below, etc.) and various devices (e.g., computing devices), as well as to allow power supply (e.g., charging) to various components of spraying system 100 (e.g. power source(s) 610, electronics assembly 112, color sensor 150, fluid conveyance 608, fluid assembly 175, etc.). For example, a charger can be "hooked-up" to port 140 such that a power source (e.g., a rechargeable battery) of spraying system 100 and its various components can be charged/recharged. This power source can be configured to provide power to any and all of the components of spraying system 100. In another example, input/output port 141 can be configured to receive a wired connection to a power source, for example a power cord configured to plug into an outlet.

FIG. 1B is a simplified block diagram showing one example spraying system 100. As illustrated in FIG. 1B, spraying system 100 includes electronics assembly 112, fluid pathway 175, fluid conveyance system 608, one or more processors or controllers 614, and can include a variety of other items 616 as well. As shown in FIG. 1B, processor(s)/controller(s) can be a component of electronics assembly 114 or can be remote from but coupled to electronics assembly 114. For the sake of illustrative clarity, spraying system 100 has been simplified in FIG. 1B. It should be understood that spraying system 100 can include any number of other items as will be discussed in more detail herein, for example with regard to FIG. 15.

In any case, fluid conveyance system 608 causes fluid to flow (or otherwise be conveyed) along fluid pathway 175 to be, for example, sprayed out of an outlet (e.g., 111). Fluid conveyance system 608 can include a number of items configured to cause a fluid to flow (or otherwise be conveyed), including, but not limited to, pump(s), motor(s), pressure vessel(s) etc. In one example, fluid conveyance system 608 comprises a liquified gas contained within a pressure vessel that is configured to apply a pressure to a fluid and/or fluid source such that the fluid is conveyed along fluid pathway 175. In one example, the pressure vessel provides a pressure of less than approximately 3000 PSI. In one example the pressure vessel provides a pressure between 100 and 1000 PSI. In one example, the pressure vessel comprises a replaceable $CO_2$ canister containing liquified $CO_2$ that provides pressure to a collapsible fluid container (e.g., bag/bladder, etc.) such that fluid within the container is pushed out (via compression of the container) of an outlet of the container and along fluid pathway 175. In one example, the replaceable $CO_2$ cannister provides a pressure of approximately 700-800 PSI. Though any number of pressure sources providing pressure at any pressure range can be used. In some examples, fluid conveyance system 608 can be controllably operated by processor(s)/controller(s) 614, for instance automatically (e.g., based on sensor signals, based on preprogrammed and/or other stored data, etc.), or based on a user input, for example on display 114. Additionally, various characteristics, parameters, etc. relative to fluid conveyance system 608 (as well as spraying system 100 generally) can be displayed via display elements on display 114.

Fluid is carried by fluid pathway 175 from a fluid source (e.g., compartments 154, fluid containers 159, etc.) through an outlet of spraying system 100 (e.g., 111). Fluid pathway 175 can include a number of items, including, but not limited to, fluid source(s), fluid line(s), metering element(s), mixing chamber(s), as well as a variety of other items. In some examples, metering element(s) can comprise valve(s) (e.g., needle valves), pump(s) (e.g., peristaltic pumps) as well as a variety of other suitable metering element(s). In one example, metering element(s) can be controllably operated by processor(s)/controller(s) 614, for instance automatically (e.g., based on sensor signals, based on preprogrammed and/or other stored data, etc.), or based on a user input, for example, on display 114. For instance, but not limited to, controlling metering element(s) to control a ratio, flow rate, volume of fluids along fluid pathway 175. Additionally, various characteristics, parameters, etc. relative to fluid pathway 175 (as well as spraying system 100 generally) can be displayed via display elements on display 114. In some examples, various fluids (e.g., differently colored paints) are controllably conveyed (e.g., caused to flow) along fluid pathway 175 to mixing chamber(s) where the separately conveyed fluids are converged and configured to mix and are output, in some examples, from a single outflow (e.g., fluid line) from the mixing chamber(s) through the outlet of spraying system 100.

It should be noted that these are merely examples of the items included in and operation of spraying system 100. Spraying system 100 can include a variety of other items and be operated in a variety of other ways, including those described further herein.

FIG. 2 is a perspective view showing spraying system 100 operated by one example user 132. As shown in FIG. 2, user 132 grips handle 106 with hand 134. Trigger finger 136 of hand 134 is thus able to actuator trigger 108 to control the flow of fluid from housing 102 out of outlet 111.

Figure 3:
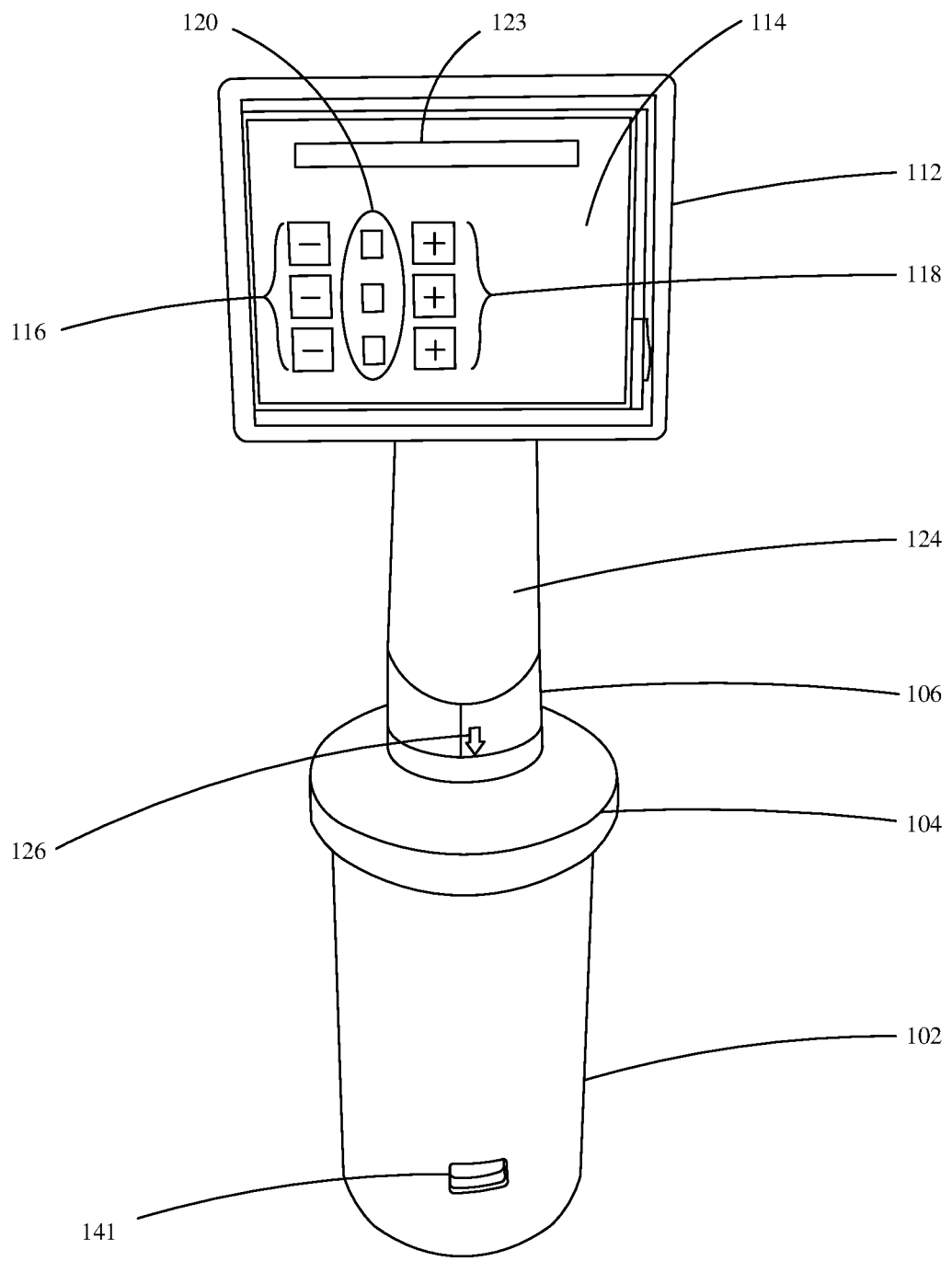
FIG. 3 is a perspective view showing one example of a spraying system.

FIG. 3 is a perspective view of spraying system 100. As shown in FIG. 3, display 114 includes user input mechanisms 116 and 118 and display elements 120 and 123. A user (e.g., 132) can actuate user input mechanisms 116 and 118 to adjust a variety of parameters and/or characteristics of spraying system 100 and/or the fluid to be sprayed. For example, the mixture of fluids (e.g., mixture of colors), the flow rate of each fluid, the brightness/darkness (e.g., hue) of the preprogrammed, determined, or selected color, as well as a variety of other characteristics and parameters. Display elements 120 can display a number or value corresponding to the fluids and/or colors. For example, the mixture of fluids (e.g., red, yellow, blue). The number or value can, in one example, correspond to a ratio, flow rate, or volume of each fluid to be mixed by spraying system 100.

Figure 4:
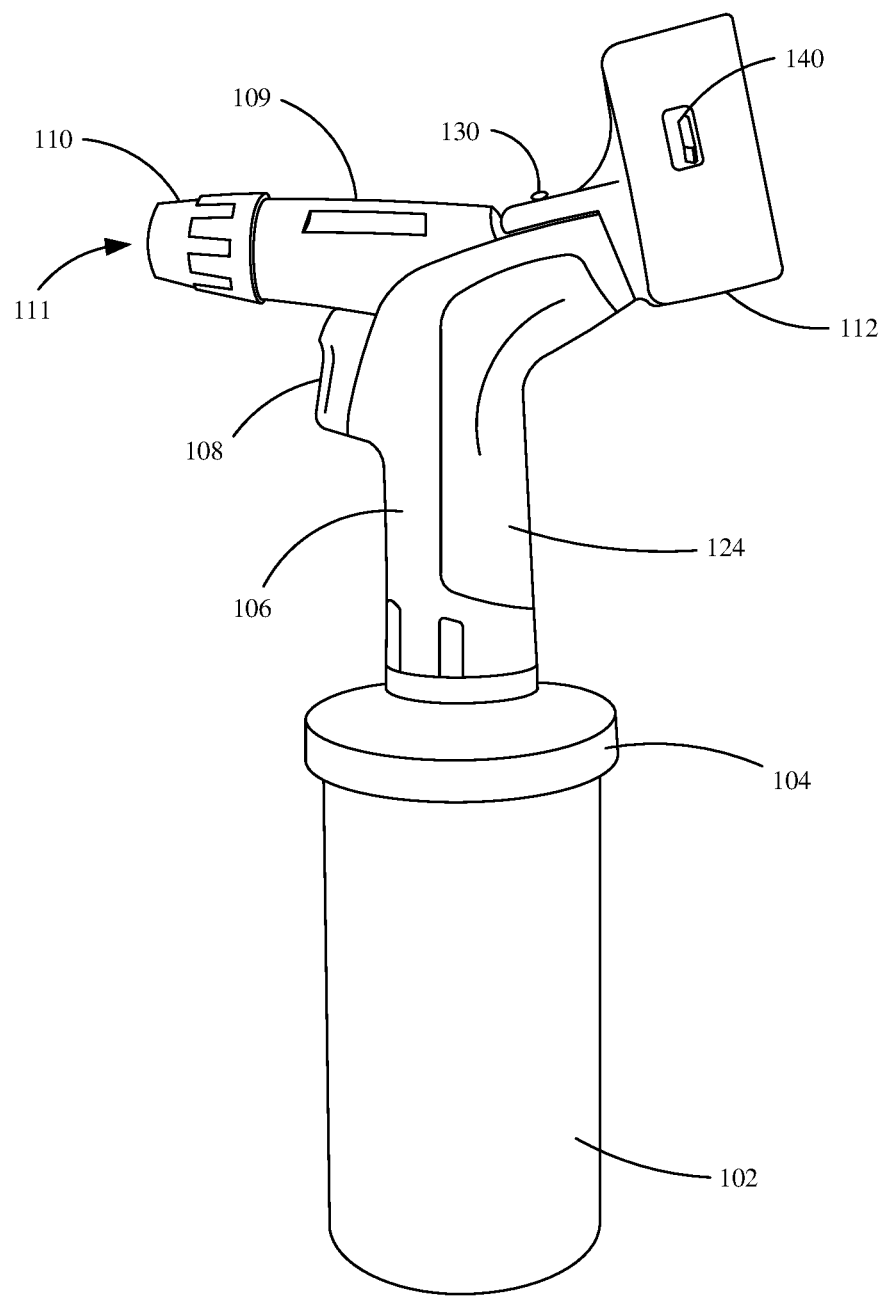
FIG. 4 is a perspective view showing one example of a spraying system.

FIG. 4 is a perspective view of spraying system 100. Electronics assembly 112 can include an input/output port (e.g., a USB port), such as input/output 140 (shown in FIG. 4) and/or input/output port 142 (shown in FIG. 5). In some examples, electronics assembly 112 can include both port 140 and port 142. In other examples, electronics assembly 112 includes only one of port 140 or port 142. Input/output ports 140 and/or 142 are configured to allow communicative coupling between electronics assembly 112 and various devices (e.g., computing devices), as well as to allow power supply (e.g., charging) to various components of electronics assembly 112. For example, a charger can be "hooked-up" to port 140 and/or 142 such that a power source (e.g., rechargeable battery) within or coupled to electronics assembly 112 can be charged/recharged. In another example, input/output ports 140 and/or 142 can be configured to receive a wired connection to a power source, for example a power cord configured to plug into an outlet.

Figure 5:
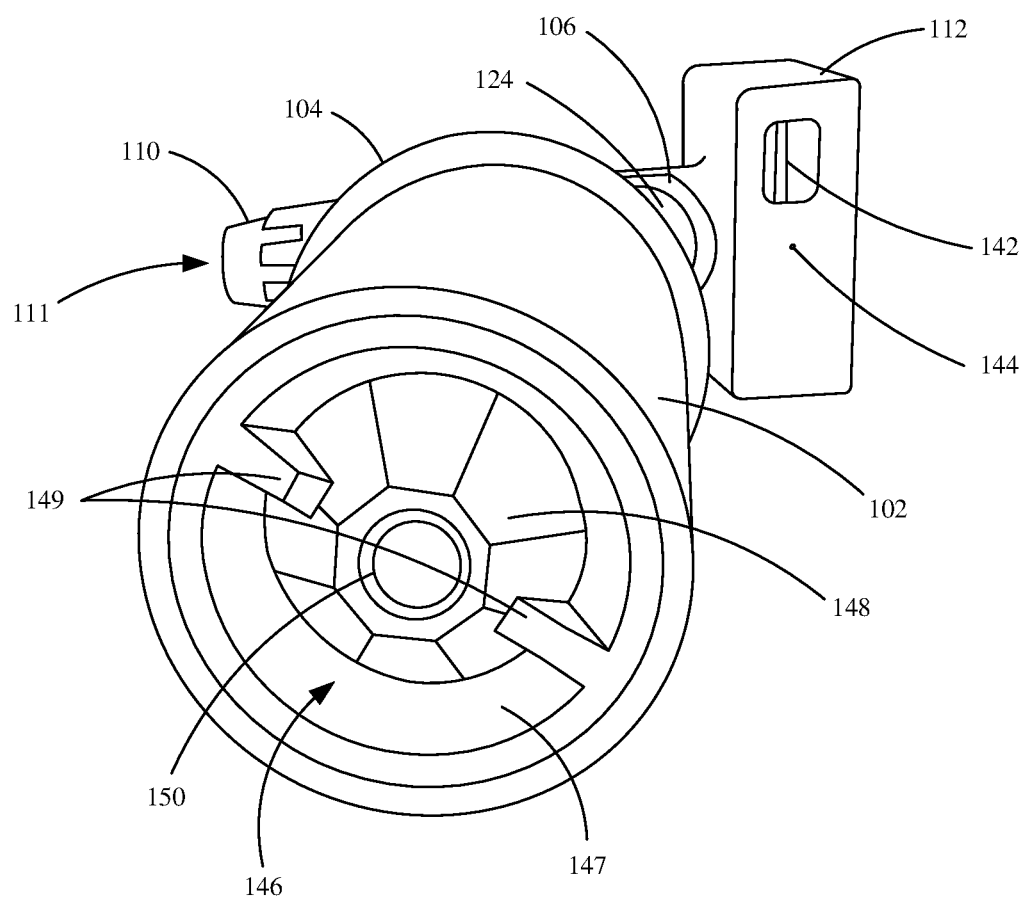
FIG. 5 is a bottom-view showing one example of a spraying system.

FIG. 5 is a bottom-view of spraying system 100. As can be seen in FIG. 5, housing 102 has an opening 146 on its bottom side configured to allow access to as well as provide a viewing pathway for color sensor 150. Color sensor 150 can be housed within housing 102, and further within sensor housing 148. Sensor housing 148 is configured to protect color sensor 150 (as well as components thereof) from contamination (e.g., dust, debris, fluid spray, etc.) and damage (e.g., contact with other elements of a worksite environment). Color sensor 150 is coupled to electronics assembly 112. Color sensor 150 can comprise an optical and/or imaging sensor (e.g., a camera) configured to sense a characteristic of a color matching surface (e.g., a surface having a color to be matched) indicative of a color of that color matching surface. The color matching surface can include a variety of items, objects, and/or surfaces, for example, but not limited to, a color sample, a color swathe, a paint chip, a surface of a wall, etc., including any other item, object, or surface that color sensor 150 can view. In another example, color sensor 150 can comprise a spectrophotometer. Color sensor 150 can include a receiver and an illumination source that can project light onto the color matching surface. Color sensor 150 can include various other items as well, such as a one or more filters to filter out undesired light.

In one example operation of color sensor 150, a user positions spraying system 100 such that color sensor 150 can scan and/or capture an image of a desired color matching surface. Housing 102 and opening 146 can provide a desirable imaging environment (e.g., lighting conditions) such that color sensor 150 can scan and/or capture an accurate image of the color matching surface. For example, housing 102 can block undesired light (e.g., ambient light) from being received by color sensor 150. In one example, a user can place the bottom side of housing 102 over the color matching surface such that the color matching surface is in a field of view of color sensor 150 and scan and/or capture an image of the color matching surface with color sensor 150. In one example, color sensor 150 can be operated via electronics assembly 112 (e.g., via a user input mechanism [e.g., a button] on screen 114) to, for example, scan and/or capture an image, adjust characteristics and/or parameters of color sensor 150 (e.g., lighting [e.g., flash], viewing angle, and various other imaging/optical system characteristics and/or parameters). Color sensor 150, which can be pre-calibrated by the manufacturer, generates a sensor signal indicative of a color which is received by controller(s)/processor(s) of electronics assembly 112 to determine the color of the color matching surface. A control/action signal (or other output) can then be generated, based on the sensor signal, indicative of the sensed color. In one example, the sensed and determined/detected color can be displayed to the user on display 114, for example as display element (e.g., a color circle) 122. Further, in some examples, the required mixture of fluids for the sensed and/or determined/detected color can be indicated by display elements (e.g., numbers/values) 120. In this way, spraying system 100 can be controlled to spray a fluid that comprises a mixture of fluids configured to replicate the color of the color matching surface.

In another example, color sensor 150 includes an illumination source (e.g., a flash element, white light generator, etc.) that is adjustable (e.g., brightness, on/off, etc.) via, for instance, a user input on display 114 or automatically via electronics assembly 112 (e.g., by a threshold [e.g., ambient light, brightness threshold]). In another example, the position of color sensor 150 is adjustable (e.g., viewing angle) via, for instance a user input on display 114 or automatically via electronics assembly (e.g., by a threshold [e.g., clarity threshold, quality threshold, position of color matching surface, etc.]).

In one example, color sensor 150 can be removable from spraying system 100. As illustrated in FIG. 5, color sensor 150 can be retained within housing 102 by retaining device 147 which can be coupled and/or fastened to spraying system 100. For example, retaining device 147 can include a surface having mating features (e.g., threads) configured to mate with mating features (e.g., threads) on an interior of housing 102 (e.g., on surface of wall defining opening 146). Retaining feature 102 can include features configured to make it easier for a user to install and uninstall retaining feature 147. As illustrated, retaining feature 147 includes projections 149 which a user can, for example, grip or bear against to remove or couple retaining device 147 to spraying system 100. In the case of threads, for example, projections 149 allow a user to more easily screw and unscrew retaining device 147.

Color sensor 150 can be removed from housing 102. For example, to allow a user to sense a color matching surface remotely from spraying system 100. Color sensor 150 can maintain a communicative coupling with spraying system 100 even when removed from housing 102, for example, color sensor 150 can maintain a wired connection with spraying system 100 (e.g., electronics assembly 112) or can maintain a wireless communicative coupling (e.g., Bluetooth) with spraying system 100 (e.g., electronics assembly 112). The removability allows, for example, a user to remove color sensor 150 from spraying system 100 during a spraying operation such that color sensor 150 is further protected from contaminants (e.g., dust, debris, liquid overspray, etc.). Additionally, the removal of color sensor 150 reduces the weight of spraying system 100 which can make it easier for the user to handle, for example, during a spraying operation. Further, the removability of color sensor 150 allows a user to scan and/or capture an image of a color matching surface without having to bring the entirety of spraying system 100 along. This can increase safety if the location of the color matching surface is in a difficult to reach location, or if, for example, a user has to climb a ladder to reach the color matching surface. Additionally, this can allow, for example, a tandem (e.g., a team) of workers at a worksite to split the operation of spraying system 100. For example, one worker can take color sensor 150 to the location of the color matching surface (which can be remote from the surface that is to be sprayed) while the other worker can remain in the location of the surface to be sprayed. It is to be understood that these are merely examples of the advantages of a removable color sensor and that numerous other advantages are contemplated herein.

Figure 6A:
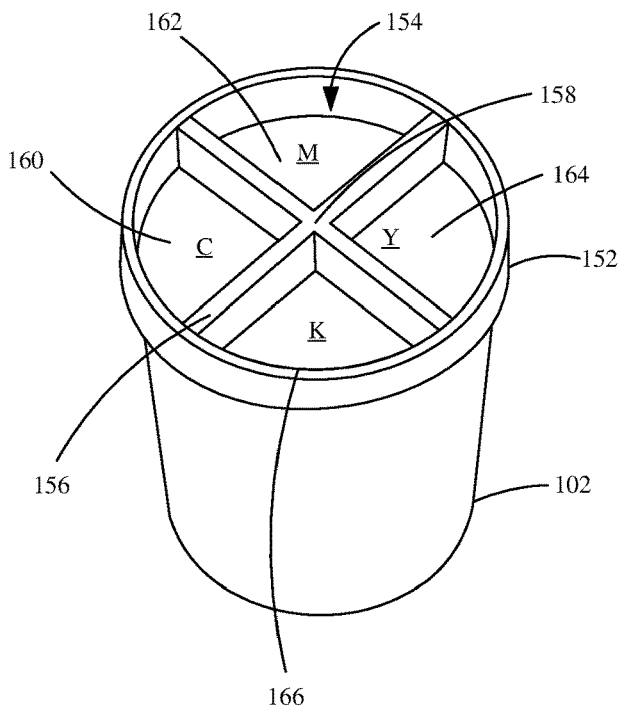
FIGS. 6A-6C are perspective views of examples of a housing.
Figure 6B:
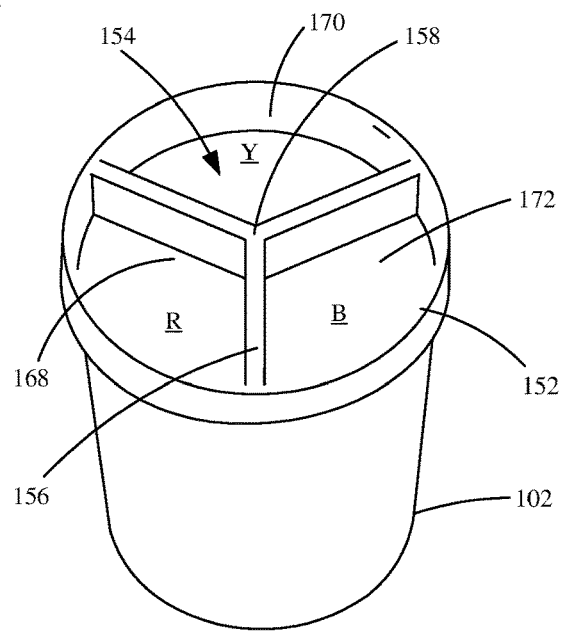
Figure 6C:
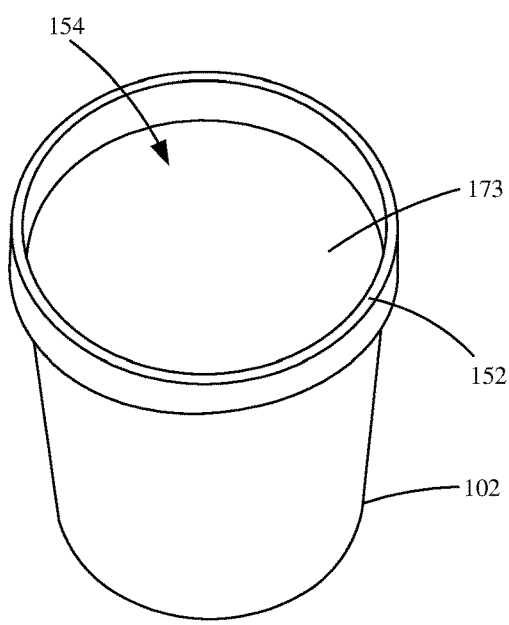

FIGS. 6A-6C are perspective views of examples of housing 102. Housing 102 includes lip 152, compartments 154, walls 156, divider 158 and fluids 160, 162, 164, and 166. As illustrated in FIG. 6, the interior of housing 102 can be divided by divider 158 into separate compartments 154 defined by walls 156 of divider 158. Each compartment 154 can hold a fluid (e.g., paint). As illustrated in FIG. 6A, housing 102 may include four separate compartments 154. Each of the four compartments 154 illustratively hold a different color paint, in this case Cyan 160, Magenta 162, Yellow 164 and Black 166 (collectively referred to as CMYK). As illustrated in FIG. 6B, in another example, housing 102 may include three separate compartments 154. Each of the three compartments 154 illustratively hold a different colored/pigmented paint, in this case, Red 168, Yellow 170 and Blue 172 (collectively referred to as RYB). As illustrated in FIG. 6C, in yet another example, housing 102 may include a single compartment 154 holding a single fluid 173. For example, housing 102 (as shown in FIG. 6C) can be configured to hold a single fluid (e.g., a single colored/pigmented paint). In some examples, spraying system 100 can operate without color matching and allow the user to, for instance, interchangeably adjust the fluid(s) to be sprayed by spraying system 100 by changing the fluid within housing 102, or attaching a new housing 102 having a different fluid. Additionally, even in examples of spraying system 100 having a multi-compartment housing 102 (e.g., FIGS. 6A and 6B), color matching is not necessary. For example, a user (e.g., via display 114) can adjustably control the flow of fluids (as well as various other characteristics, parameters, etc.) without requiring color matching.

In other examples, housing 102 can have any number of compartments 154 containing any number of fluids (e.g., colored paints), and/or any number of compartments containing any number of fluids of various combinations, for example, multiple compartments of the same color fluid along with singular compartments of different colored fluids. Additionally, each of the separate compartments 154 can be configured to hold a separate type of fluid, for example, but not limited to, primer, paint, sealer, etc.

While illustrated examples are discussed above in the context of red-yellow-blue (RYB) and/or cyan-magenta-yellow-black (CMYK) color models, it is to be understood that a variety of other color models can be used, for example, but not limited to red-green-blue (RGB). Furthermore, a hue-saturation-value (HSV), sometimes called hue-saturation-brightness (HSB), model can be used wherein white and black are added to modify, for example, base colors generated by a variety of colors (e.g., RYB, CMYK, RGB, etc.). It should be understood that spraying system 100 can include any number of colored/pigmented fluids having any number and/or variety of colors/pigments.

Additionally, spraying system 100 and by extension housing 102 can include a number of sensors. For example, housing 102 (or spraying system 100) can include fluid level sensors that sense the amount of remaining fluid in housing 102 (e.g., the amount of fluid remaining in each of the compartments 154). Fluid level sensing can be done in a number of ways, including, but not limited to, ultrasound, pressure, etc. When the fluid from one or more compartments is running low a user may be notified. For example, an alert or other indication can be surfaced to a user interface, for example, display 114 (as well as various other displays on other machines, systems, devices, etc.), or a device (e.g., a handheld device, a computer, etc.). In some examples the device can be remote from spraying system 100 and communicated with over a network.

In any case, and as will be discussed in further detail below, spraying system 100 is configured to, in one example, pump or otherwise cause fluid from each of the compartments 154 to flow along a fluid pathway and out of outlet 111. The ratio, volume and/or flow rate (e.g., volumetric flow rate) can be controlled by spraying system 100 and can be user adjustable, modifiable, etc. In another example, the color is modifiable (e.g., via a user input) and spraying system 100 (e.g., color matching system 624) automatically adjusts the mixture of fluids based on, for example, a user input. For the purpose of illustration, but not by limitation, in the example shown in FIG. 1 with "lime green", spraying system 100 can pump or otherwise cause fluid, according to the mixture requirements (e.g., "0" Red, "3" Yellow and "1" Blue), to flow from each of the compartments 154.

Figure 7:
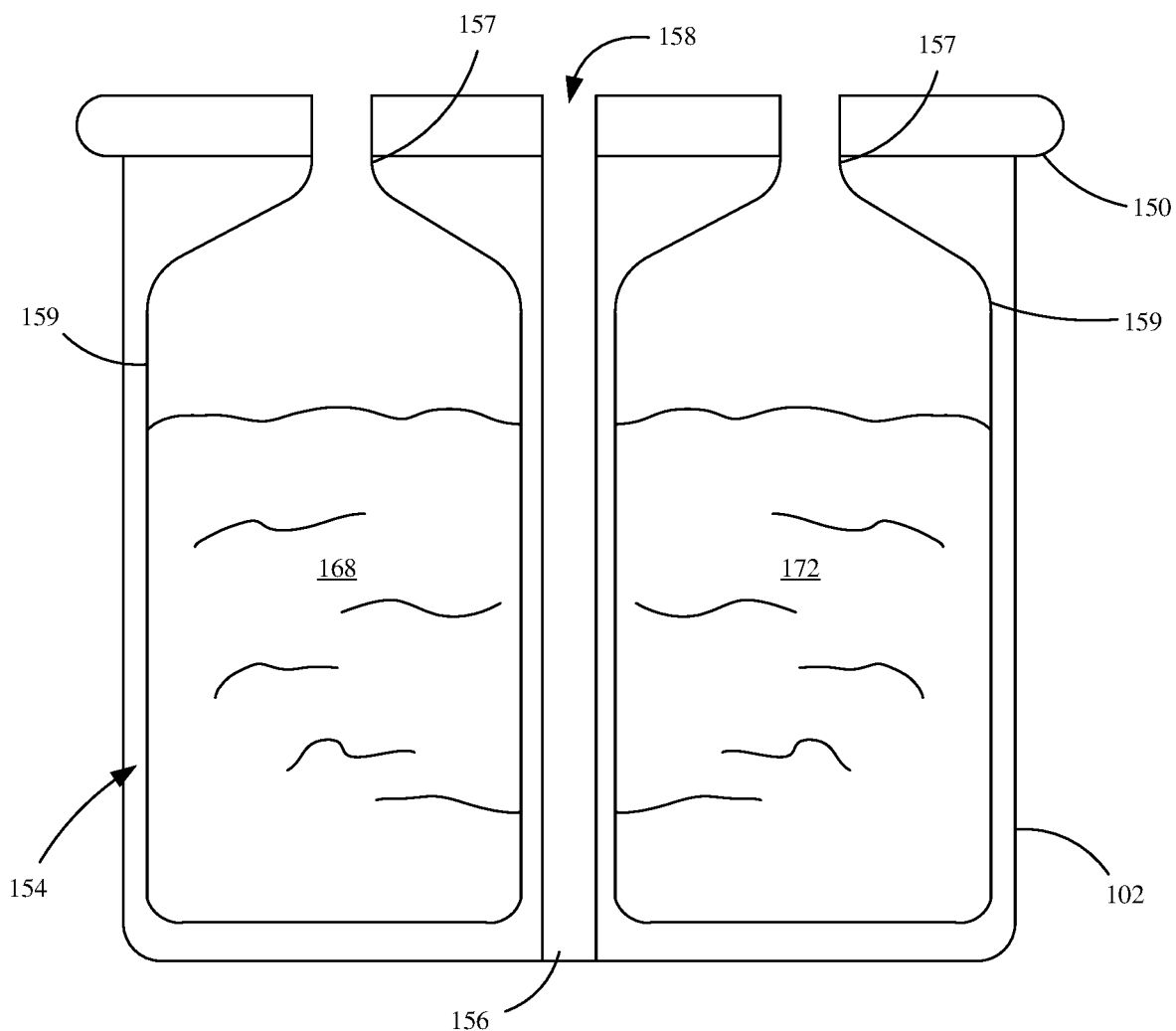
FIG. 7 is a sectional view showing one example of a housing.

FIG. 7 is a sectional view showing one example of housing 102. Housing 102 includes lip 152, compartments 154, wall 156, connection portion 157, divider 158, fluid containers 159, red 168 and blue 172. As illustrated in FIG. 7, housing 102 is a sectional view of housing 102 from FIG. 6B and illustrates a sectional view of compartments 154 that hold red 168 and blue 172. As shown in FIG. 7, compartments 154 can include or comprise fluid containers 159. In one example, fluid containers 159 comprise collapsible bladders/bags made of suitable material (e.g., polymer, rubber, etc.) that are configured to collapse as fluid is drawn from them (or gaseous pressure is applied to them) such that substantially all of the fluid can be drawn from fluid containers 159 and there is little to no remainder. In one example, and as will be explained in more detail below, the fluid in compartments 154 and/or in fluid containers 159 can be pressurized by mixing with and/or being exposed to a pressurizing fluid contained in a pressure vessel (shown below). In this way, spraying system 100 comprises an "airless" spraying system, such that none of the propellant leaves the outlet with the fluid to be sprayed (e.g., paint). In one example, the fluid in the pressure vessel is $CO_2$ (e.g., the pressure vessel comprises a replaceable $CO_2$ cannister). In one example, connection portion(s) 157 can connect with or otherwise be coupled to (e.g., fluidically coupled) to metering devices configured to control the flow of fluid from fluid containers 159.

Figure 8A:
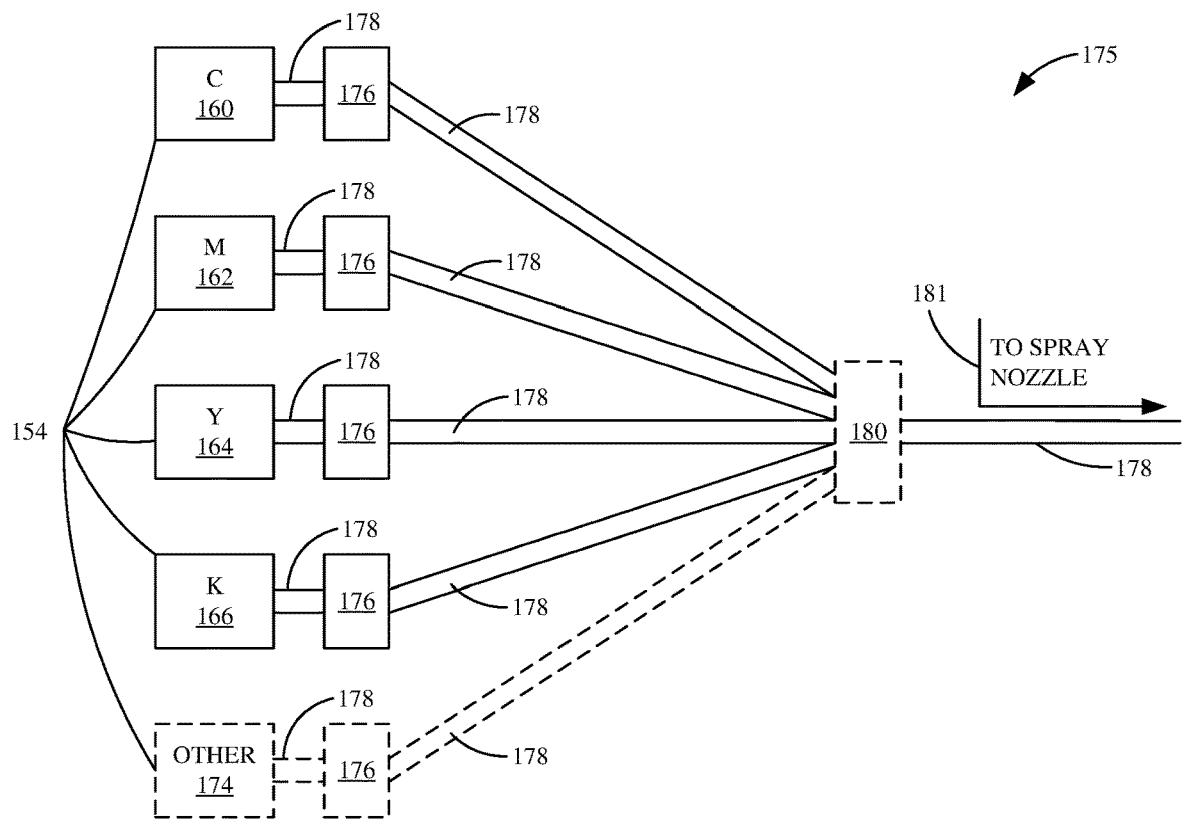
FIGS. 8A-8B are diagrammatic views showing one example of a fluid pathway.
Figure 8B:
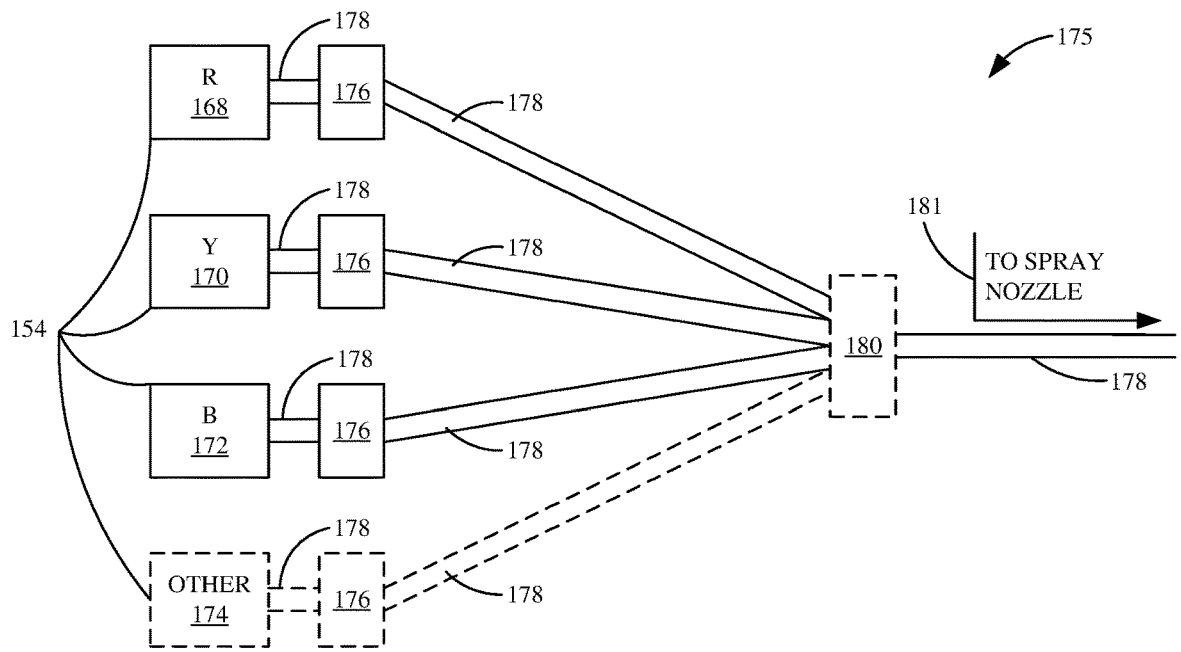

FIGS. 8A-8B (collectively referred to as FIG. 8) are diagrammatic views showing one example of fluid pathway 175. Fluid pathway 175 includes compartments 154, Cyan 160, Magenta 162, Yellow 164, Black 166, Red 168, Yellow 170, Blue 172, other(s) 174, metering element(s) 176, fluid lines 178 and mixing chamber(s) 180. The flow of fluid along fluid pathway 175 can be controlled by metering element(s) 176. Metering element(s) 176, can comprise a number of devices, including, but not limited to pumps (e.g., peristaltic pumps), valves (e.g., needles valves) as well as various other metering devices. Metering element(s) 176 can be controllable (e.g., programmatically, via circuitry [e.g., electronic signals from a sensor], etc.) and be configured to actuate based upon generated control/action signals from controller(s)/processor(s) (e.g., a control/action signal generator). For example, but not by limitation, upon color sensor 150 generating a sensor signal indicative of a sensed color of a color matching surface, controller(s)/processor(s) (e.g., within electronics assembly 112) can determine the color to be matched and generate control signals to fluid conveyance system 608 and/or metering element(s) 176 to control the flow (e.g., ratio, flow rate, volume etc.) of fluid from compartments 154 (as well as fluid containers 159) along fluid pathway 175. In another example, spraying system 100 can include a motor configured to drive metering element(s) 176 (e.g., a pump) based on generated control signals to the motor. While multiple metering element(s) 176 are shown in FIG. 7, this need not be the case. A single metering element 176 can be used to control the flow from all of compartments 154, for example, a metering valve manifold.

In any case, metering element(s) 176 control the flow of fluid from compartments 154, which can include or comprise fluid containers 159, along fluid pathway 175 through fluid lines 178. Fluid lines 178 can comprise any number of materials or structures suitable for the carriage of fluid (e.g., polymer/rubber tubing, etc.). The metered fluid is optionally sent to mixing chamber(s) 180 such that the separate fluids drawn from compartments 154 are mixed before reaching spray tip 110 (and out of outlet 111) as indicated by arrow 181. Mixing chamber(s) 180 can comprise a number of devices with various internal geometries. For example, the internal geometry of mixing chamber(s) 180 can comprise a series of progressive and/or regressive steps having varying diameters (e.g., a series of progressive and/or regressive diameters). In another example, mixing chamber(s) 180 can comprise a turbulation chamber. The internal geometry of mixing chamber(s) 180 can be such that it is configured to effectively mix separate fluids from compartments 154 and/or maintain desirable pressure in fluid lines 178. As shown in FIG. 8, fluid pathway 175 can also include other 174 which can comprise any number of fluids, including fluids (e.g., paints) having different color/pigment than those listed. Additionally, compartments 154, while shown with specific colors for purpose of illustration, can include any number of colors, any number of types of fluids (e.g., primer, paint, sealer, etc.), as well as any number of combinations thereof. For instance, compartments 154 can contain all of the same color, all of the same type of fluid. In another example, a number of compartments 154 can have the same color or type of fluid while another number of compartments 154 can have a different color or type of fluid.

Figure 9:
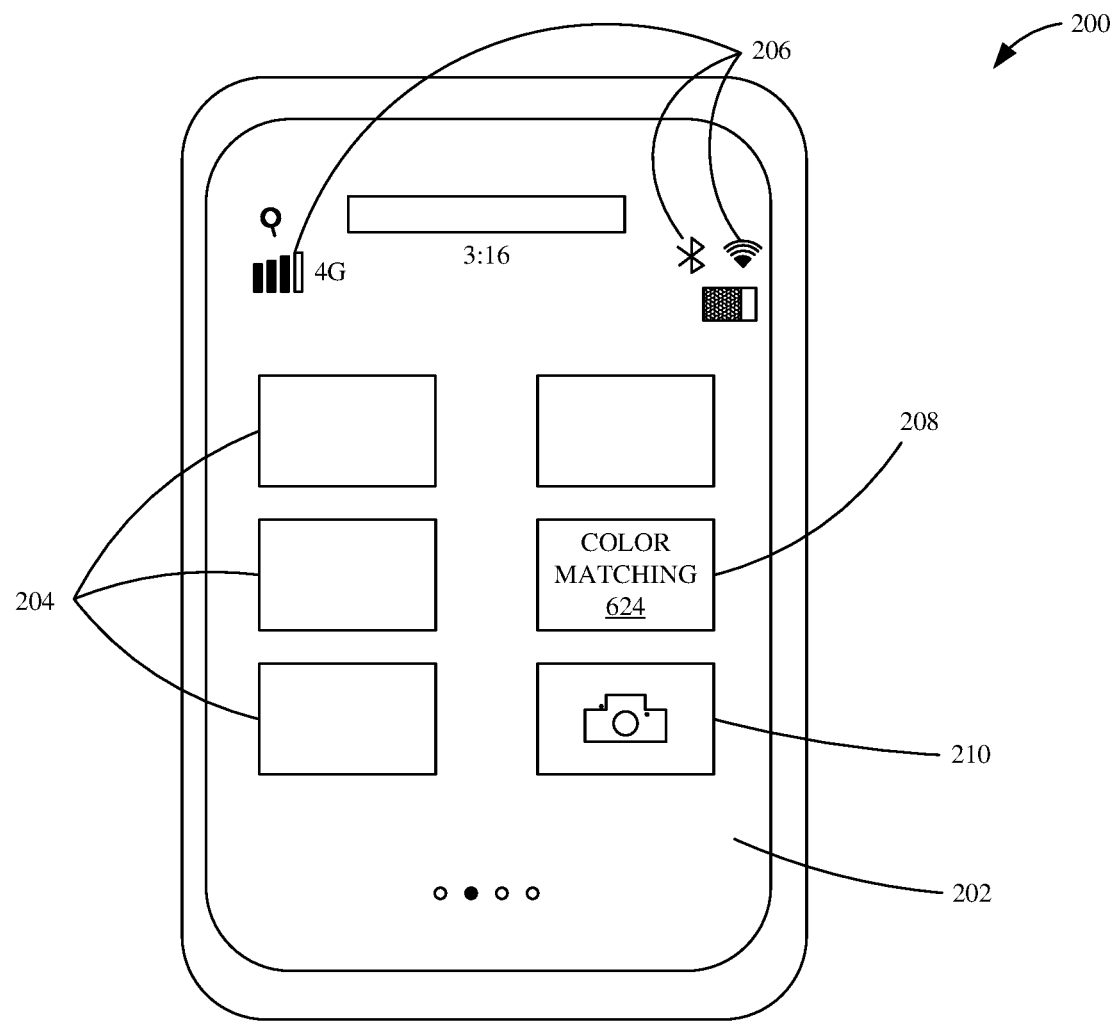
FIG. 9 is a perspective view showing one example of a computing device.

FIG. 9 is a perspective view of one illustrative example of a computing device 200. Device 200 includes display 202, illustratively shown as an interactive touchscreen display, and can include icons, tiles or other user input mechanisms 204. Mechanisms 204 can be used by a user (e.g., via user input, such as touch) to perform various functionalities with device 200, for example, but not limited to, running applications. Device 200 can have various connections 206 to various networks and/or devices, including, but not limited to, cellular, Bluetooth, Wi-Fi, etc. In one example, device 200 can include one or more user input mechanisms 204 configured to cause device 200 to perform various functionalities relative to color matching (e.g., color sensing, fluid mixing, etc.), as well as other functionalities relative to spraying system 100, or a mixing machine 300 (shown below). For example, device 200 can include color matching 624 as, for example, an application, represented by input mechanism 208.

In one example, color matching application 208 can interact with a color sensor. For example, an imaging sensor (e.g., camera) on device 200, as represented indicated by input mechanism 210 (which can comprise a camera application that allows a user (or color matching system 624) to access and control a camera associated with device 200). A user, using color matching application 208, can, in one example, scan and/or capture an image of a color matching surface (e.g., paint chip, wall, etc.) indicative of a color of the color matching surface. Color matching application 208 can, based on the scan and/or captured image, determine a color of the color matching surface (e.g., via processor(s)/controller(s), logic, color matching system 624 described further below, etc.). Color matching application 208 can include and/or display various display elements and/or user input mechanisms. For example, color matching application 208 can include user input mechanisms (e.g., buttons, actuators, etc.) configured to allow a user to modify the brightness/darkness of the determined color, modify the mixture of fluids, as well as control, modify, change, etc. various other characteristics and/or parameters, including characteristics and/or parameters relative to a color of a fluid, fluid mixture, etc. Once a color is determined or selected (e.g., by the user) it can be communicated to spraying system 100 via, for example, communicative coupling (e.g., Bluetooth) between device 200 and spraying system 100 (e.g., electronic assembly 112). In another example, it can be communicated to mixing machine 300 via, for example communicative coupling (e.g., Bluetooth) between device 200 and mixing machine 300 (shown below). Based on the communication, spraying system 100 can be controlled to generate fluid relative to the determined or selected color, determined or selected fluid mixture, etc. Similarly, based on the communication, mixing machine 300 can be controlled to generate fluid relative to the determined or selected color, determined or selected fluid mixture, etc. The determined or selected colors can be, in one example, stored in various data stores, local to or remote from device 200 and/or the color matching application 208. The colors can be stored automatically by, for instance, application 208 or manually by a user.

In another example, the color matching application 208 can include preset (e.g., preprogrammed) colors, selectable by a user, which can, in some examples, be modified by a user (e.g., brightness/darkness). In such an example, it is not necessary to first sense a color matching surface, though in some examples, sensing of the sprayed surface can be done to determine/detect quality characteristics and/or metrics relative to the sprayed fluid and/or operation of the spraying system.

Some applications, like Sherwin-Williams ColorSnap® Visualizer allow a user to preview a color on a surface, such as a wall in an image. In some examples, color matching application 208 can provide a display that demos a determined or selected color on a surface, such as a wall, that is imaged by an imaging sensor on device 200. In this way, the user can preview a selected or determined color on a surface to be sprayed. In some examples, the user can simultaneously modify characteristics (e.g., hue, brightness, shade, color) of the color being demoed on the surface, and such modification will be dynamically represented in the display. The color matching application 208 can output values, such as a ratio, a mixture, a volume, or a flowrate, of the different colors (such as the different colors in spraying system 100 or mixing machine 300) needed to be mixed generate the color being displayed on the surface. In yet other examples, the imaging sensor on device 200 can be used to scan identifying information, such as a barcode or data matrix (e.g., QR code) corresponding to a paint color, such as identifying information on a paint can, a product brochure, a color, paint sample stickers, as well as any number of other items having identifying information that indicates a color of paint. Based on the scanned information, color matching application 208 can provide a display of the color corresponding to the color indicated by the identifying information, such as a display of the color on a surface imaged by the imaging sensor on device 200, or a display of the color as a display element on device 200, as well as output values, such as a ratio, a mixture, a volume, or a flowrate, of the different colors needed to be mixed to generate the color indicated by the identifying information.

While not shown in FIG. 9, it is to be understood that device 200 can include a variety of components, including, but not limited to various logic, circuitry, processor(s)/controller(s), data stores (e.g., memory, cloud, etc.), etc.

Figure 10:
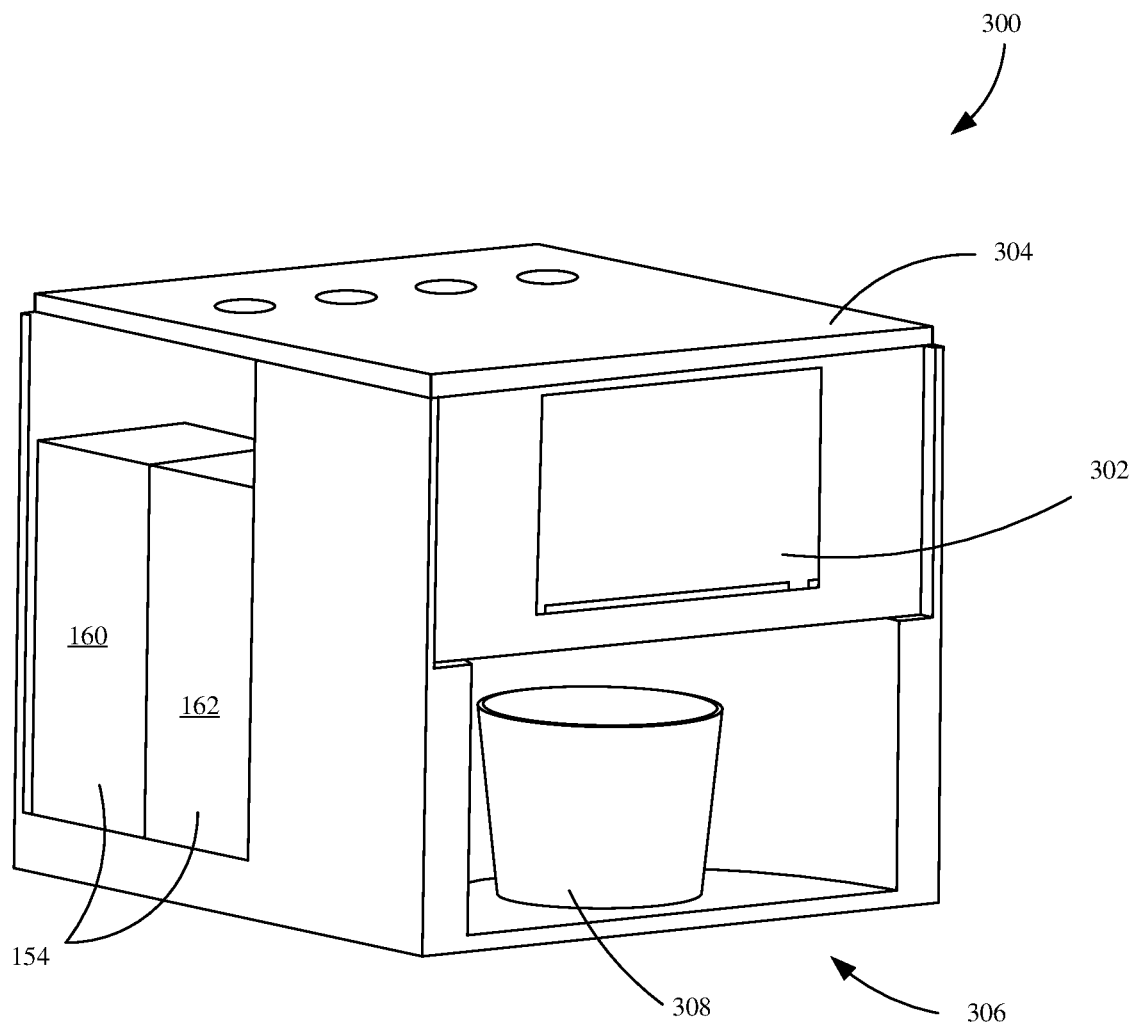
FIG. 10 is a perspective view showing one example of a mixing unit.

FIG. 10 is perspective view showing one example of a mixing machine 300. Mixing machine 300 includes display 302, housing 304, docking station 306, mixed fluid container 308 and compartments 154. Mixing machine 300 can, in one example, mix a variety of fluids (e.g., colored/pigmented paints) from fluid compartments 154, based on a variety of received inputs and/or control/action signals, and dispense the mixed fluids into mixed fluid container 308 (e.g., a paint bucket) to be used with a variety of spraying systems, including, but not limited to, spraying system 500 shown below. Mixing machine can, in one example, dispense the mixed fluids through an outlet (not shown). For example, mixing unit 300 can mix fluids from compartments 154 based on received sensor signals from a variety of sensor(s) (e.g., 150, 210, 602 shown below, etc.) indicative of a color. Additionally, mixing unit 300 can mix fluids from compartments 154 based on control/action signals received from a variety of control systems (e.g., 112, 208, 604 shown below, etc.). Furthermore, mixing unit 300 can mix fluids from compartments 154 based on user inputs on a number of displays including, but not limited to, displays 114, 202 and 302. Display 302 is illustratively shown as an interactive touchscreen display that can include a number of display elements, user input mechanisms, as well as a variety of other items. In one example, a user can interact with display 302 to select and/or modify characteristics or parameters relative to fluid mixture or color, including, but not limited to, selecting a color stored in a data store associated with mixing unit 300 (e.g., preprogrammed and/or saved colors stored in memory). While in FIG. 10, compartments 154 are illustratively shown as comprising/including cyan 160 and magenta 162, mixing unit 300 can include a variety of other colored/pigmented fluids (e.g., paint) as well as a variety of other types of fluids.

While not shown in FIG. 10, is to be understood that mixing unit 300 can include a variety of components, including, but not limited to various logic, circuitry, processor(s)/controller(s), data stores (e.g., memory, cloud, etc.), etc.

Figure 11A:
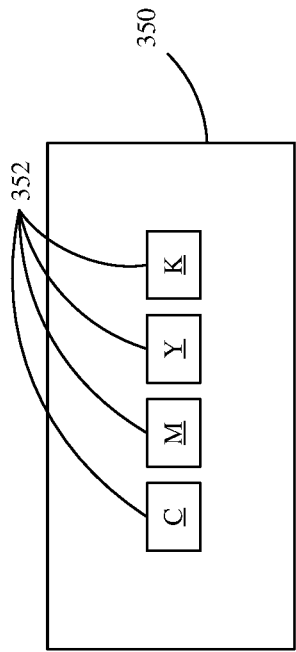
FIGS. 11A-11D are illustrative examples of reference samples and/or surfaces.
Figure 11B:
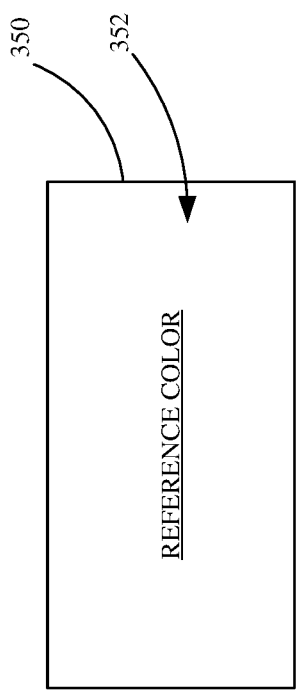
Figure 11C:
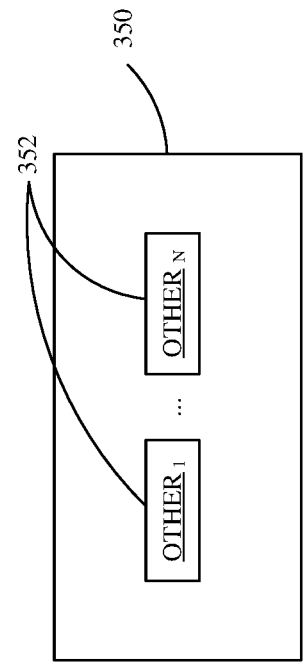
Figure 11D:
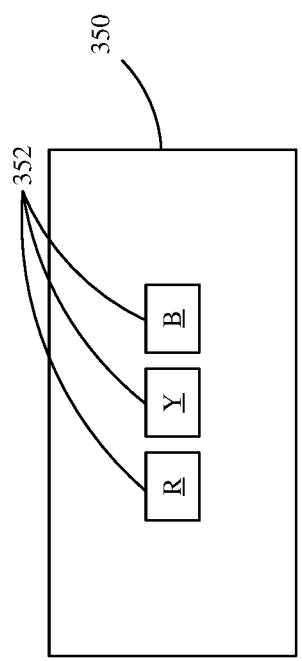

FIGS. 11A-11D (collectively referred to as FIG. 11) are illustrative examples of reference sample and/or surface 350 (hereinafter "reference 350"). Reference 350, illustratively shaped as a handheld card (though it can be any number of shapes), includes a number of reference color(s) 352 on its surface. The reference color(s) each have a known color value, that is predefined, preset, programmed, stored, etc. (e.g., calibrated) or otherwise obtained by color matching 624. For example, a portion (including the entire surface) of reference 350 can comprise a single reference color 352 (as illustrated in FIG. 11A). In another example, a number of portions of a surface of reference 350 can include a number of reference color(s) (as illustrated in FIGS. 11B-11D). For example, reference 350 can include red, yellow, and blue reference color(s) 352 (as illustrated in FIG. 11B). In another example, reference 350 can include cyan, magenta, yellow, and black reference color(s) 352 (as illustrated in FIG. 11C). In yet another example, reference 350 can include any number of different reference color(s) 350 (as illustrated in FIG. 11D). While a particular size of reference color(s) 350 is shown in FIG. 11, it is to be understood that reference color(s) 350 can cover a variety of surface area(s) of reference 350.

In any case, the known color values of reference 350 allows a user to calibrate color sensor(s) and/or color matching 624 (including preset, preprogrammed, or otherwise stored color(s) and fluid mixture(s) in memory [e.g., data store(s)]). In one example, calibrating includes compensating for environmental factors of the location in which the image is scanned and/or captured by the color sensor(s), for example, but not limited to, compensating for the effect(s) of lighting condition(s), viewing angle, reflectance (e.g., specular, diffuse, etc.), as well as any other factors which can affect image quality (e.g., accuracy).

In one example, a user holds (or otherwise places) reference 350 proximate to the color matching surface (e.g., the surface to be matched), such that both reference 350 and color matching surface are within the field of view of the color sensor(s) (e.g., 150, 210, etc.), and scans and/or captures an image. Reference 350 has reference color(s) 352 with predefined, preset, preprogrammed, etc. (e.g., calibrated) color values. Color matching 624 can, based on the scanned or captured image, determine the difference (e.g., offset) of the color values indicated by the image relative to the known color values of the reference color(s) 352 and compensate the color values of the color matching surface to be matched based on the determined difference. In this way, the color to be matched can be compensated for environmental factors. For illustrative example, but not by limitation, reference colors 352 can comprise the color red with color values known to color matching 624 (e.g., predefined, preset, preprogrammed, etc. [e.g., saved in memory and accessible]). A user can hold (or otherwise place) the red reference color next to the color matching surface (e.g., a brown wall) and scan and/or capture an image with color sensor(s). Because of, for example, the lighting conditions at the worksite, the known reference color red can appear, in the image, as "light-red" for instance, and the brown wall can appear in the image as "light-brown." However, because the red reference color has color value(s) known to color matching 624, color matching 624 can determine a difference between the color value(s) of the red (i.e., light red) in the image to the known color value(s) for the red reference color 352. Based on this determined difference, color matching 624 can compensate the color value(s) of the brown (i.e., light-brown) in the image such that the environmental factors (e.g., lighting) are compensated for (e.g., effectively filtered out) and color matching 624 can control spraying system 100, mixing machine 300, etc., to generate a fluid having a color more accurately representative of the actual color of the color matching surface (e.g., wall), in this particular example, the generated fluid can be closer to the brown of the wall rather than the light-brown of the image.

Color matching system 624 can determine colors, mixtures of fluids, as well as various other characteristics in a number of ways. Generally, the color sensor receives illumination reflected from a color matching surface and based on the received illumination, determines a color of the color matching surface. For example, a color sensor (e.g., 150, 210, etc.) can comprise an imaging or optical device that scans and/or captures an image of a surface to be matched. In one example, the scan or image can be compared to preset, predefined, preprogrammed, etc. colors stored in memory (e.g., a data store). These stored colors can have known color values, for example, but not limited to, known fluid mixtures required to produce those colors (e.g., ratios of red-yellow-blue, cyan-magenta-yellow-black, as well as ratios of a variety of other color combinations). Based on the comparison, color matching system 624 can determine a color of the color matching surface and generate an output based on the determination (e.g., control/action signals based on the determination). In another example, color matching system 624 can perform analysis of the scan and/or image and obtain color data, such as red-yellow-blue (RYB) color data, cyan-magenta-yellow-black (CMYK) color data, red-green-blue (RGB) color data, as well as hue-saturation-value (HSV), also sometimes referred to as hue-saturation-brightness (HSB), color data. Based on the obtained color data, color matching system 624 can determine various characteristics and/or parameters relative to color and/or fluid mixture, for example, but not limited to color values, fluid mixture requirements (e.g., ratio, flow rate, volume, etc.) and based on those determinations, control, for example, spraying system 100, mixing machine 300, to generate a fluid (e.g., mix a fluid) having a color that matches and/or approximately matches the sensed color matching surface.

In one example, the color sensor can comprise an illumination detector and an illumination source. The illumination source projects light onto a color matching surface and the illumination detector detects light reflected from the color matching surface and based on the detected light, a color of the color matching surface can be determined. In one example, the color can be determined electronically (e.g., a spectrophotometer), for example, using a light-to-voltage converter in the sensor that causes the color sensor to respond to the reflected light by generating a voltage proportional to the color. The illumination source can include, for example, a white light generator, a flash feature on a camera, as well as a number of other illumination sources. In some examples, only the ambient light is used, and the effects of the ambient light can be compensated for if necessary. The color sensor can also include various filters, for example, filters that are configured to filter out undesired light (e.g., undesired wavelengths). The filters can have wavelength sensitivities at various lengths (e.g., various nanometer sensitivities).

Figures 12A, 12B, 12C:
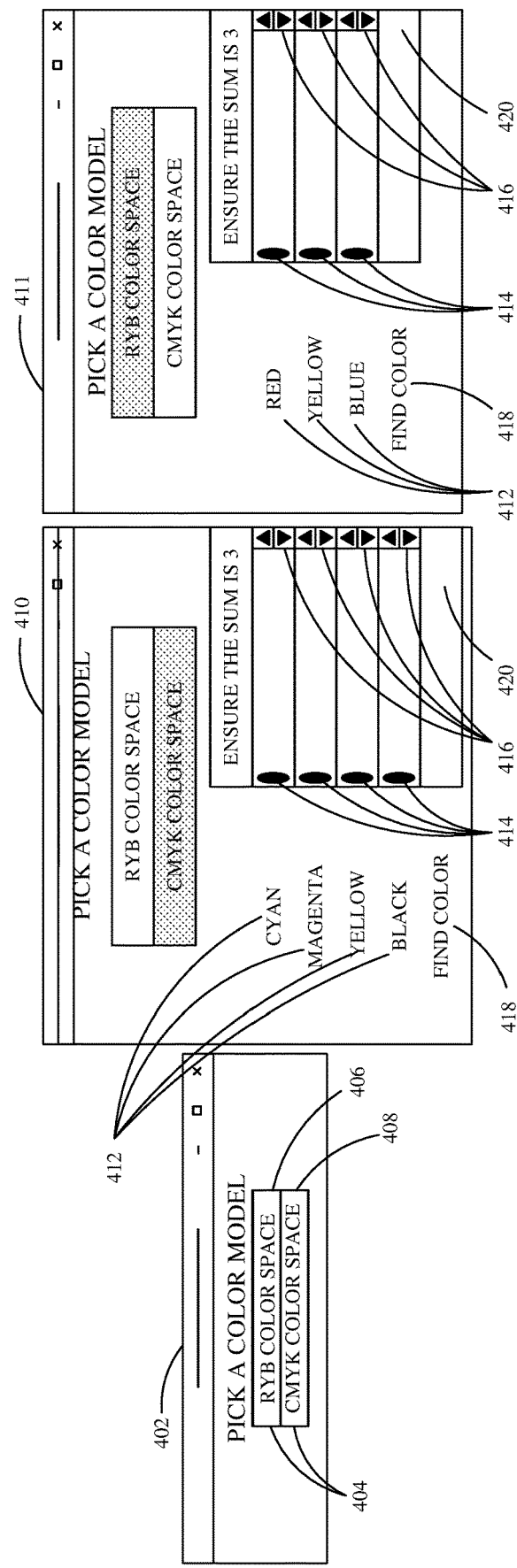
FIGS. 12A-12C are illustrative examples of user interface displays.

FIGS. 12A-12C are illustrative examples of user interface displays that can be displayed on various devices. FIGS. 12A-12C (collectively referred to as FIG. 12) are illustrative examples of user interfaces that can be generated on a display (e.g., 114, 202, 302). User interface 402 can comprise a "main menu" having selection mechanisms 404 that are user interactable/selectable and correspond with, in one example, a respective color space, for example, red-yellow-blue (RYB) as indicated by 406, cyan-magenta-yellow-black (CYMK) as indicated by 408, as well as a variety of other color space combinations. Upon user selection of the RYB or CYMNK color space 406 or 408, user interfaces 410 or 411 can be displayed which include display elements 412, which, as illustrated, can correspond to a particular color, as well as include value display elements 414, which, as illustrated, can correspond to a value/metric associated with a particular color, for example a flow rate or volume of a particular color. In one example, value display elements 414 are automatically populated based on a color sensed by, for example, sensors 150 and/or 210. Interfaces 410 or 411 can further include actuators 416 (represented by arrows) which are user interactable/selectable to, for example, adjust the value/metric associated with a particular color displayed by value display elements 414. Interfaces 410 or 411 can also include a search element 418, interactable/selectable by a user, to, for example, search for a stored (e.g., in a data store) color, which when found, can be displayed in display element 420 as, for example, a textual representation of the color (e.g., "LIME GREEN").

Figure 13:
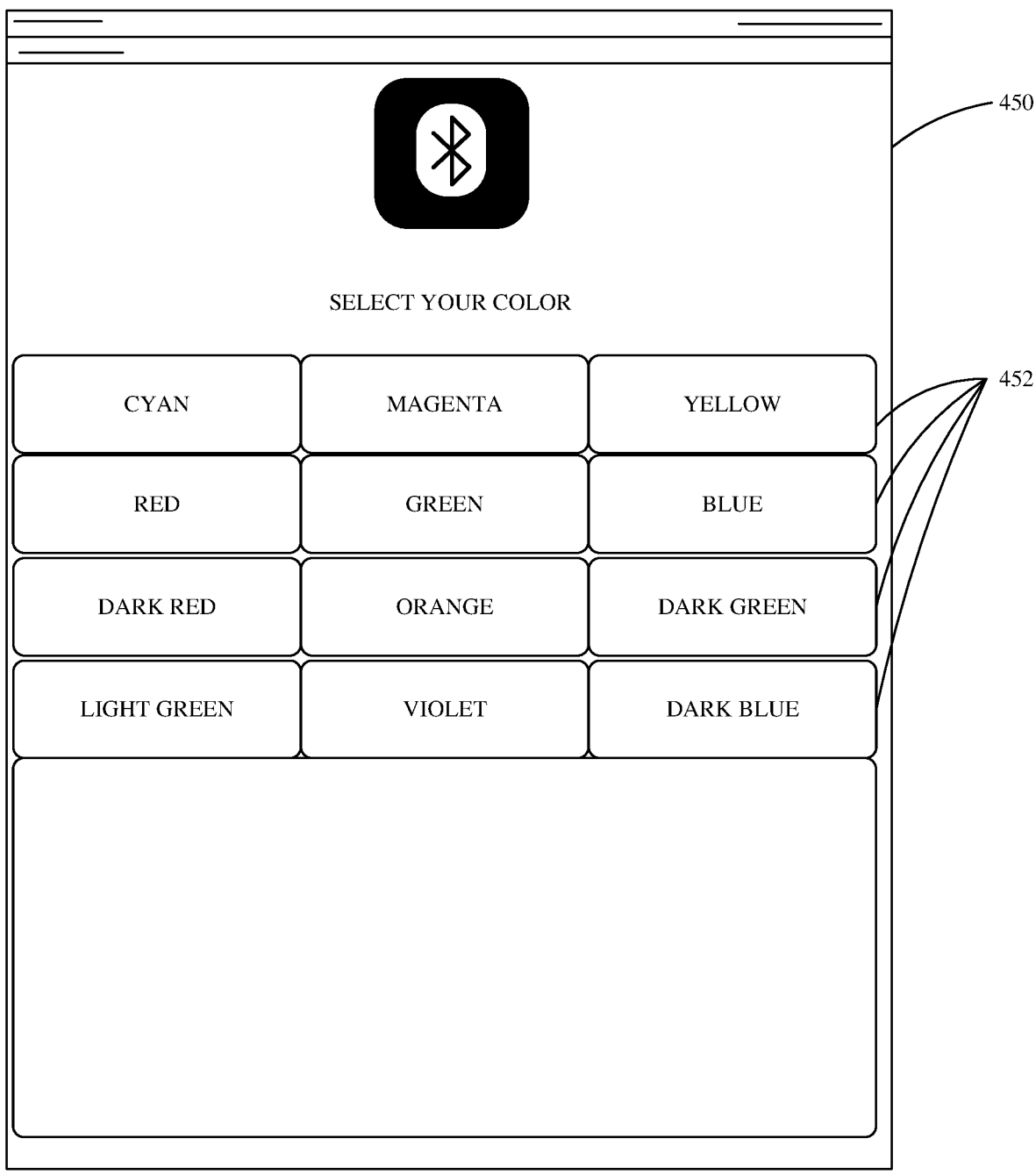
FIG. 13 is an illustrative example of a user interface display.

FIG. 13 is an illustrative example of a user interface 450 that can be generated on a display (e.g., 114, 202, 302). User interface 450 can comprise a "main menu" having a number of user input mechanisms 452 that are user interactable/ selectable and correspond with, in one example, a respective color. In one example, user interface 450 allows a user to select from a number of preprogrammed and/or saved colors with a corresponding mixture (e.g., ratio, flow rater, volume, etc.). In another example, upon selection of one of user input mechanisms 452, another user interface is displayed which can include a variety of display elements, user input mechanisms, etc., which can, in some examples, be used by the user to modify a parameter or characteristic relative to fluid mixture or color (e.g., brightness/darkness). In one example, upon selection of a color, a user can be directed to a user interface that allows the user to select from a range of shades (e.g., gradient) corresponding to the selected color. Similarly, in combination with or alternatively, user interface 450 can display a color gradient that is user interactable/selectable to select a color.

Figure 14:
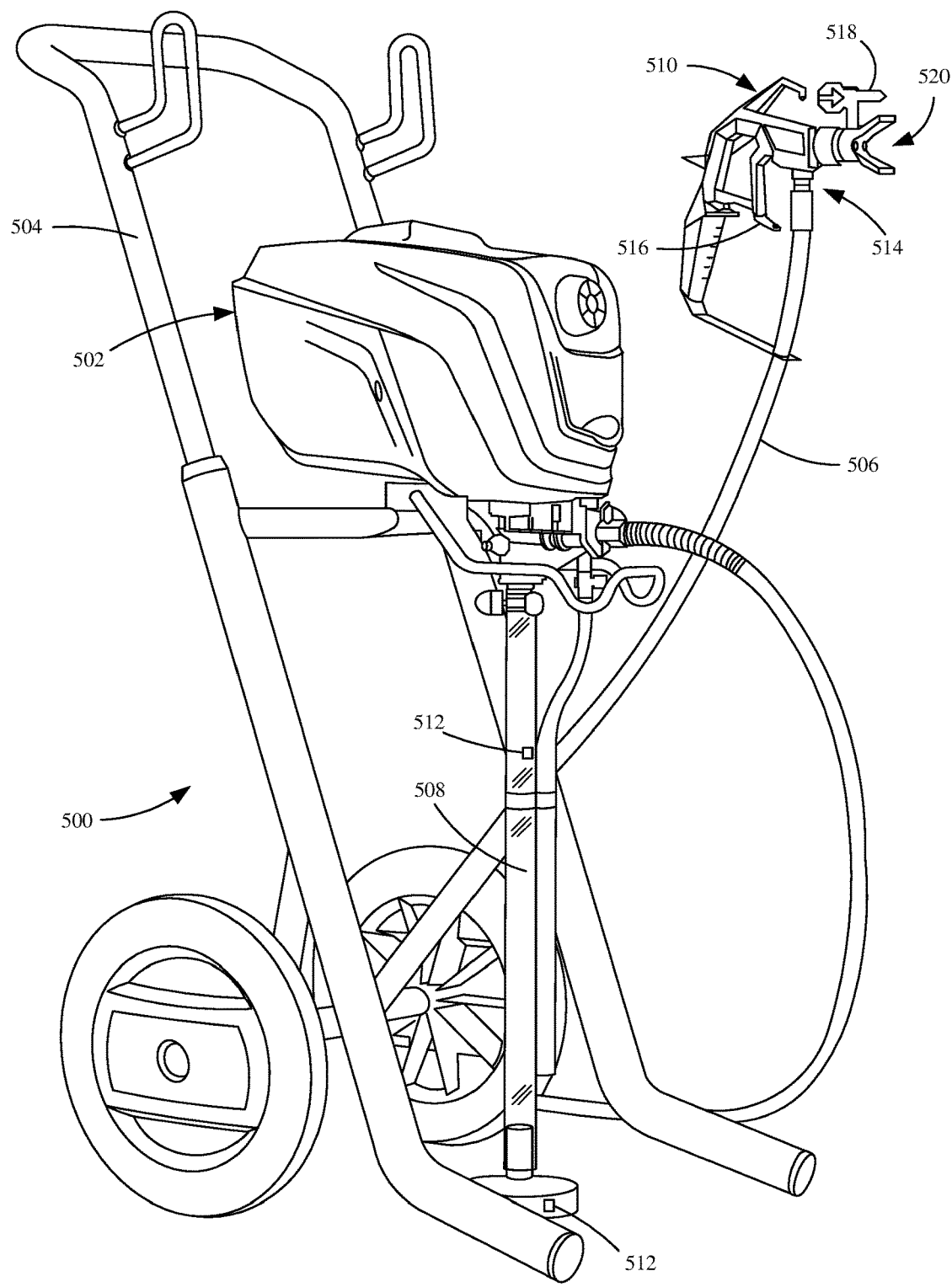
FIG. 14 is a perspective view showing one example of a spraying system.

FIG. 14 is a perspective view showing one example spraying system 500. Spraying system 500 includes pump 502 that is mounted on a cart 504 and couples to applicator 510 through delivery line 506. Pump 502 includes a fluid intake 508 that is disposed within a fluid source (e.g., a five-gallon bucket of paint [e.g., mixed fluid container 308]). Pump 502 pumps the fluid from the fluid source through fluid intake 508 and pumps the fluid at a given pressure to applicator 510 through delivery line 506. Mounted on or otherwise coupled to fluid intake 508 are fluid level sensor(s) 512 that can sense the amount of remaining fluid in the fluid source (e.g., via ultrasound, pressure, etc.). When the fluid is running low, a user can be notified. For example, surfacing an indication (e.g., alert, notification, message, display, etc.) on a display. Fluid level sensor 512 can also track usage over time and notify a user at given intervals, or store values indicative of usage in a data store. For example, a user may want to be notified when they have three-quarters remaining, one-half remaining, one-quarter remaining, etc. This may be useful in helping a user maintain an even coat of fluid coverage over a large spraying job.

Fluid applicator 510 (e.g., spray gun) receives fluid through an inlet 514 from delivery line 506. Trigger 516 actuates to allow fluid flow from inlet 514 to an outlet 520 of tip 518 where the fluid is expelled. Tip 518 can be replaced with a different type of tip for a different spray pattern or to accommodate a different fluid. While fluid applicator 510 is shown in FIG. 14, various other fluid applicators can be used in combination with the architectures shown herein, including, but not limited to, spraying system 100. For example, spraying system 100.

Figure 15:
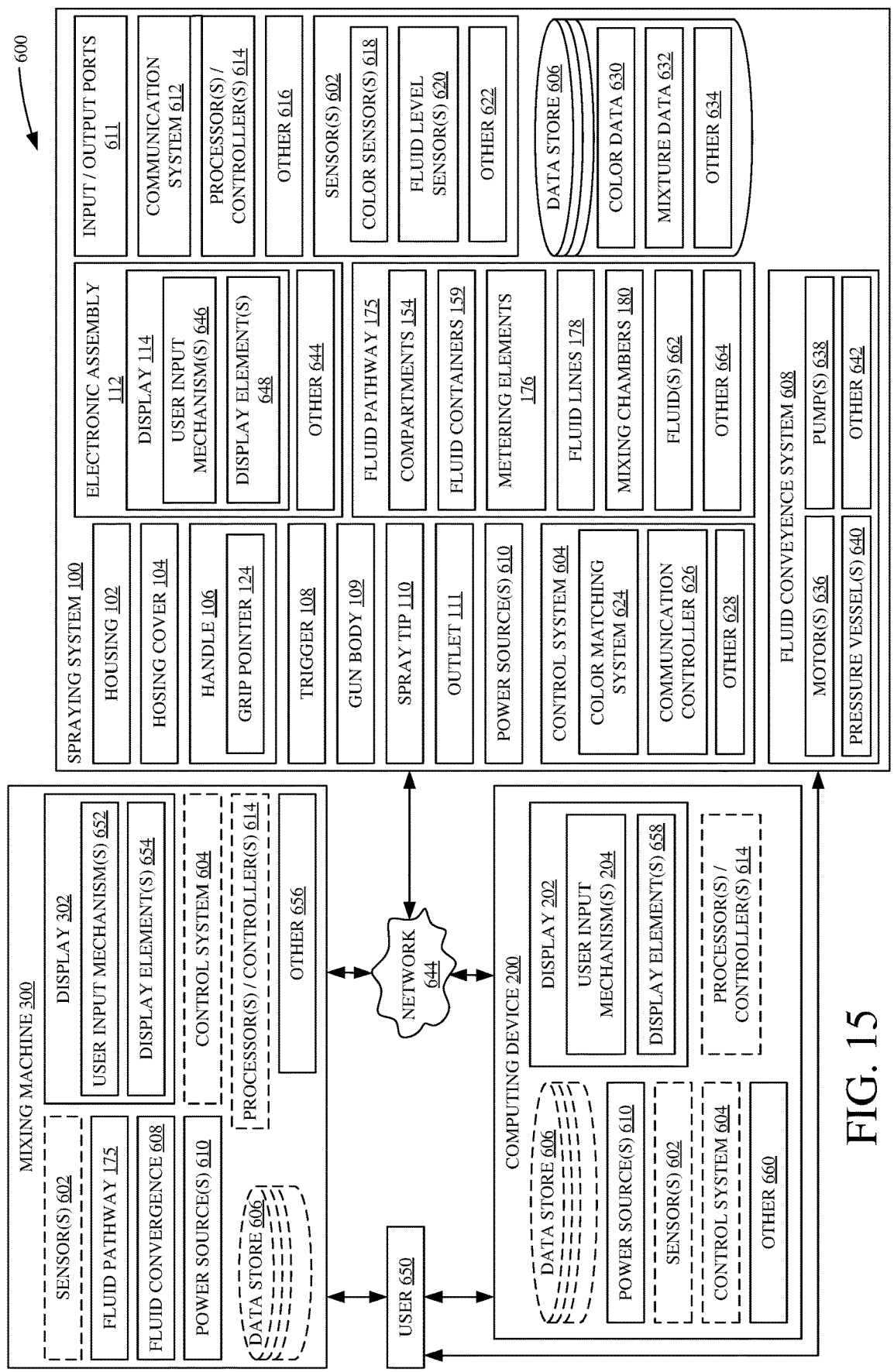
FIG. 15 is a block diagram showing one example of a spraying system architecture.

FIG. 15 illustrates one example of a spraying system architecture 600 having a spraying system 100 configured to perform a spraying operation. Examples of spraying system 100 include, but are not limited to, spraying system 100 illustrated in FIGS. 1-8. Spraying system 100 can be communicatively coupled to computing device 200 and/or mixing machine 300 via various connections (e.g., Bluetooth) over network 644. Additionally, user 650 can interact with or otherwise operate spraying system 100, computing device 200 and/or mixing machine 300.

Spraying system 100 includes housing 102, housing cover 104, handle 106 (which can include grip portion 124), trigger 108, gun body 109, spray tip 110, outlet 111, electronics assembly 112, fluid pathway 175, sensor(s) 602, control system 604, data store 606, fluid conveyance system 608, power source(s) 610, input/output ports 611, communication system 612, processor(s)/controller(s) 614, and other items 616 as well. Electronics assembly 112 includes display 114, user input mechanism(s) 646 (e.g., 116 and 118), display element(s) 648 (e.g., 120, 122, 123) and can include other items 649 as well.

Display 114 is, in one example, an interactive touchscreen display having user input mechanism(s) 646 configured to allow intractability with user 650 to control or modify various characteristics and/or parameters relative to spraying system 100 as well as display element(s) 648 configured to display various information relative to spraying system 100. Display 114 can, via display elements 648, display a variety of characteristics, parameters, data, etc. of spraying system 100, for example, but not limited to, battery life, amount of fluid remaining, amount of fluid used in current operation (or per operation, or over life-time, etc.), flow rate, current mixture, as well as a variety of other information relative to spraying system 100, including any and all characteristics sensed by sensor(s) 602 and/or determined by control system 604.

Fluid pathway 175 includes compartments 154 (which may include or comprise fluid containers 159), metering element(s) 176, fluid lines 178, mixing chambers(s) 180, fluids 662 (which may include fluids of a variety of colors, including those described herein, and/or a variety of fluid types) and can include other items 664 as well.

Control system 604 is configured to control other components and systems of spraying system 100 as well as computing device 200 and mixing machine 300. For instance, control system 604 includes a communication controller 626 configured to control communication system 612 to communicate between components of spraying system 100 and/or with other systems, machines, devices, etc. (e.g., computing device 200, mixing machine 300, etc.) over a network 644. Network 644 can be any of a wide variety of different types of networks such as the Internet, a cellular network, Bluetooth, a wide area network (WAN), a local area network (LAN), a near-field communication network, or any of a wide variety of other networks or combinations of networks or communication systems.

Communication system 612 can include wireless communication logic, which can be substantially any wireless communication system that can be used by the systems and components of spraying system 100 to communicate information to other items, such as between control system 604, sensor(s) 602, electronics assembly 112, fluid pathway 175, fluid conveyance system 608, and data store 606. This information can include the various sensor signals and output signals generated by the sensor characteristics and/or sensed characteristics.

Sensor(s) 602 can include any number of different types of sensors that sense or otherwise detect any number of characteristics. In the illustrated example, sensor(s) 602 include color sensor(s) 618, fluid level sensor(s) 620 and can include other sensor(s) 622 as well. Color sensor(s) 618 are configured to sense a color matching surface and generate a sensor signal indicative of a color of the color matching surface. Color sensor(s) 618 can include, but are not limited to, a variety of optical or imaging sensors (e.g., camera(s), receiver and illumination source, spectrophotometer, etc.), as well as color sensor(s) 150 and 210. Fluid level sensor(s) 620 are configured to sense a level of fluid in a fluid source (e.g., level and/or volume of remaining fluid) such as compartments 154, fluid containers 159, as well as a variety of other fluid sources, and generate a sensor signal indicative of the remaining fluid in the fluid source(s). Other sensor(s) 622 can include any number of sensors. For example, positional sensors configured to sense a position of spraying system 100, for instance, the position relative to or a distance from a surface to be sprayed, for example, but not limited to, a time of flight camera or a laser-based distance sensor configured to sense a distance of spraying system 100 from an object (e.g., wall to be sprayed, color matching surface, etc.). Other sensor(s) 622 can include orientation sensors, to sense, for instance, the tilt of spraying system 100. Other sensor(s) 622 can include pressure sensor(s) configured to sense a pressure within, for example, fluid lines 178, compartments 154, fluid containers 159, pressure vessel(s) 640, etc. Other sensor(s) 622 can include flow sensor(s) configured to sense a flow rate of fluid through fluid pathways 175, for instance.

Control system 604 is configured to control various characteristics and/or parameters of spraying system 100, computing device 200, mixing machine 300 including systems and elements thereof. Control system 604 receives or otherwise accesses sensor signals from sensor(s) 602 to determine a number of characteristics and generate a number of action/control signals based thereupon. Control system 604 includes color matching system 624, communication controller 626 and can include other items 628 as well. Color matching system 624, which will be discussed in more detail below, is generally configured to determine colors (e.g., sensed by sensor(s) 602, selected by user 650, etc.) and generate control/action signals to various components of architecture 600 to mix fluids based on the determined colors. Other items 628 can include various other systems, circuitry, logic as well as a variety of other items. Additionally, based upon received or accessed sensor signals from sensor(s) 602, control system 604 can generate control/action signals to surface a variety of displays, recommendations or other indications (e.g., alerts) on, for instance, a variety of displays (e.g., 114, 202, 302).

In one example, based on a sensor signal indicative of the position of spraying system 100 relative to a surface to be sprayed (e.g., a wall), control system 604 can control display 114 to surface an indication indicative of the distance. For example, but not limited to, activating display element(s) 648 to indicate the distance. For instance, a red light to indicate that the distance is sub-optimal (e.g., too far from or too close to the surface to be sprayed), or a green light to indicate that the distance is optimal (e.g., optimal spraying distance to/from surface to be sprayed, such as for optimal spraying coverage). Similarly, based on a sensor signal indicative of the orientation (e.g., tilt) of spraying system 100, control system 604 can control display to surface an indication indicative of the orientation. For example, but not limited to, activating display element(s) 648 to indicate the orientation. For instance, a red light to indicate that the orientation is sub-optimal, or a green light to indicate that the orientation is optimal. Similarly, display element(s) 648 can comprise a scale (e.g., a red-to-green progressive/regressive scale) indicative of a current level of optimality of the position and/or orientation of spraying system 100.

Spraying system 100 includes a data store 606 configured to store data for use by spraying system 100, computing device 200 and/or mixing machine 300, such as color data 630, which can include a variety of data relative to various colors (e.g., sensed colors, user selected/modified colors, preprogrammed colors, etc.), mixture data, which can include a variety of data relative to fluid mixture requirements (e.g., ratio of fluid, flow rate, volume, etc.) for various colors, as well as various other data 634.

Fluid conveyance system 608 is a controllable subsystem configured to convey fluid from fluid sources along fluid pathways. Fluid conveyance system 608 include motor(s) 636, pump(s) 638, pressure vessel(s) 640 and other items 642 as well. In one example, fluid conveyance system 608 includes a battery-powered motor 636 (e.g., powered by power source(s) 610, such as a rechargeable battery) that drives a pump 638 (e.g., a gear pump) to controllably convey fluid from fluid sources. In another example, fluid conveyance system 608 includes a pressure vessel 640 that contains a pressurized or liquified gas used to pressurize the fluid in compartments 154 and/or fluid containers 159. In one example, pressure vessel 640 comprises a $CO_2$ cartridge with liquified $CO_2$, which can apply a pressure of around 700-800 PSI to a fluid source. When trigger 108 is actuated by user 650, the liquified $CO_2$ is expanded into, for example, compartments 154 and/or fluid containers 159, and it evaporates, creating a gaseous pressure. In one example, it creates a gaseous pressure of 700-800 PSI. In another example, fluid container 159 comprises a compressible bladder/bag that has a connection portion 157 that connects or otherwise couples (e.g., fluidically couples) to metering element(s) 176, for instance a valve. $CO_2$ can thus be released into compartments 154 and the gaseous pressure compresses the compressible bladder/bag in order to convey fluid along fluid pathway 175 (e.g., upon actuation of trigger 108). It should be understood various other pressurized or liquified gases can be used which can apply pressure of various PSI ranges.

Fluid conveyance system 608 can be coupled to and/or disposed within spraying system 100, as well as other systems, devices and/or machines (e.g., mixing machine 300). For example, but not limited to, a $CO_2$ cartridge coupled (e.g., fluidically) to compartments 154 and/or fluid containers 159 (e.g., via suitable fluidic pathways [e.g., valves, lines, conduits, tubing, etc.]) and can be disposed within spraying system 100, for example, within handle 106, housing 102 and various other locations.

Power source(s) 610 are configured to provide power to components of spraying system 100, computing device 200, and/or mixing machine 300. Power source(s) 610 can comprise any number of power sources, including, but not limited to, batteries, rechargeable batteries, wired connections (e.g., power cord configured to plug into an outlet), as well as a variety of other power source(s). In one example, power source(s) 610 comprise a rechargeable battery that can be recharged via input/output ports 611 (e.g., 140, 141, 142) which may comprise, for example, USB ports (e.g., micro-USB ports). In another example, power source(s) 610 comprise a rechargeable battery that is removably coupled to spraying system 100.

Processor(s)/controller(s) 614 allow for the control of spraying system 100, computing device 200 and/or mixing machine 300 and can be utilized by various elements of architecture 600, including, but not limited to, control system 604. Similarly, the various logic of architecture 600 can be embodied within or executed by processor(s)/controller(s) 614.

A user 650 is shown interacting with computing device 200 and mixing machine 300 (as well as spraying system 100). Computing device 200 can include any number of computing devices (e.g., a mobile device, a tablet, a computer, etc.) including computing device 200 illustrated in FIG. 9. Computing device 200 includes display 202, power source(s) 610, and can include other items 660 as well. Computing device 200 can also optionally include (as represented by the dashed lines) sensor(s) 602, control system 604, data store 606, and processor(s)/controller(s) 614. For example, computing device 200 can include control system 604 which can include some or all of the components of control system 604, as discussed with reference to spraying system 100, for instance, color matching 624. Display 202 includes user input mechanisms 204 and display elements

658 that can display any number of characteristics, parameters, data, and/or other information relative to computing device 200 and/or architecture 600, including, but not limited to, characteristics sensed by sensor(s) 602 and/or determinations by control system 604.

Mixing machine 300 can include any number of devices configured to mix fluids including mixing machine 300 illustrated in FIG. 10. Mixing machine 300 includes fluid pathway 175, display 302, fluid conveyance system 608, power source(s) 610, and can include other items 656 as well. Mixing machine 300 can also optionally include (as represented by the dashed lines) sensor(s) 602, control system 604, data store 606, and processor(s)/controller(s) 614. For example, computing device 200 can include control system 604 which can include some or all of the components of control system 604, as discussed with reference to spraying system 100, for instance, color matching 624. Display 302 includes user input mechanism(s) 652 configured to allow user interaction with and/or control of mixing machine 300 and display element(s) 654 configured to display any number of characteristics, parameters, data, and/or other information relative to mixing machine 300 and/or architecture 600, including, but not limited to, characteristics sensed by sensor(s) 602 and/or determinations by control system 604.

Figure 16:
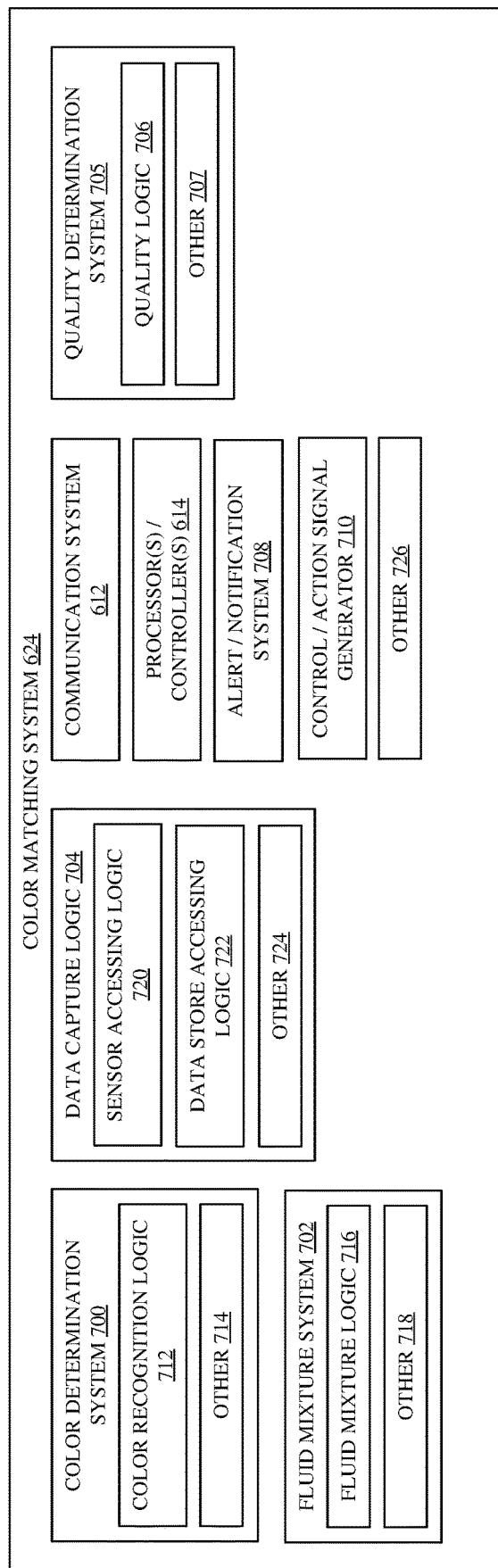
FIG. 16 is a block diagram showing one example of a color matching system.

FIG. 16 is a block diagram illustrating one example of color matching system 624. Color matching system 624 includes communication system 612, processor(s)/controller(s) 614, color determination system 700, fluid mixture system 702, data capture logic 704, quality determination system 705, alert/notification system 708, control/action signal generator 710, and can include other items 726 as well. Color matching system 624 is configured to determine a color of a fluid to be sprayed, determine the required fluid mixture required to generate a fluid having the determined color, determine a quality of the fluid sprayed based on a comparison of the fluid sprayed to the determined color, as well as a variety of other functionalities. Color matching system 624 is further configured to, based on the various determinations, generate action/control signals to, for instance, control the operation of spraying system 100, computing device 200 and/or mixing machine 300 or to generate displays, recommendations, and/or other indications (e.g., an alert).

Data capture logic 704 includes sensor accessing logic 720, data store accessing logic 722, and other logic 724. Sensor accessing logic 720 can be used to obtain sensor data (or values indicative of the sensed variables) provided from sensor(s) 602 that can be used for a number of determinations including, but not limited to, determining a color of a color matching surface, determining requirements for fluid mixture to generate fluid having a particular color, determining a quality of a color of fluid sprayed, as well as a variety of other determinations.

Data store accessing logic 722 can be used to obtain stored data from a data store (e.g., 606) for a number of determinations including, but not limited to, determining a color of a color matching surface, determining requirements for fluid mixture to generate fluid having a particular color, determining a quality of a color of fluid sprayed, as well as a variety of other determinations.

Upon receiving sensor data or indications of the sensed characteristics, as well as various other data, including data from a data store, color determination system 700 can determine a color for a fluid to be sprayed. This can include, for example, color recognition logic 712 determining a color of a color matching surface sensed by a color sensor (e.g., 150, 210) and/or determining a color based on a user input (e.g., user selection of preprogrammed colors, user modification of color, etc.). Various other types of determinations relative to color of a fluid to be sprayed can also be made by other logic 714.

Based on the various determinations, color determination system 700 can, for example, generate various recommendations/indications via alert/notification system 708 (e.g., surfacing a display to displays via display elements). Additionally, color determination system can generate various control/action signals via control/action signal generator 710 to control spraying system 100, computing device 200, and/or mixing machine 300. Additionally, color determination system 700 can communicate, via communication system 612, the determinations to various other components of architecture 600 (e.g., fluid mixture system 702).

Upon receiving sensor data or indications of the sensed characteristics, various other data from a data store, as well as communications from, for example, color determination system 700, fluid mixture system 702 can determine fluid mixture requirements for a fluid to be sprayed. This can include, for example, fluid mixture logic 716 determining a ratio, flow rate, volume, etc. of fluid from fluid sources (e.g., compartments 154, containers 159). Various other types of determinations relative to mixture requirements of a fluid to be sprayed can also be made by other logic 718.

Based on the various determinations, fluid mixture system can, for example, generate various recommendations/indications via alert/notification system 708 (e.g., surfacing a display via display elements). Additionally, fluid mixture system 702 can generate various control signals via control/action signal generator 710 to control spraying system 100, computing device 200 and/or mixing machine 300. Additionally, fluid mixture system 702 can communicate, via communication system 612, the determinations to various other components of architecture 600.

As illustrated in FIG. 16, color matching system 624 includes quality determination system 705. Upon receiving data or indications of the sensed characteristics, various other data from a data store, as well as communications from, for example, color determination system 700 and/or fluid mixture system 702, quality determination system 705 can determine various quality metrics relative to spraying system 100, computing device 200 and/or mixing machine 300. For example, upon receiving sensor data from a color sensor indicative of a color of substance sprayed onto a surface, quality logic 706 can determine a quality of the fluid sprayed based on, for example, a comparison of the color of the fluid sprayed to a comparison of the determined color. In another example, upon receiving sensor data from a flow sensor, for example, quality logic 706 can determine a quality of the operation of fluid pathway 175 based on, for example, a comparison of the required mixture determination. Various other types of determinations of quality metrics relative to spraying system 100, computing device 200 and/or mixing machine 300 can be made by other logic 707.

Based on the various determinations, quality determination system 705 can, for example, generate various recommendations/indications via alert/notification system 708 (e.g., surfacing a display via display elements). Additionally, quality determination system 705 can generate various control signals via control/action signal generator 710 to control spraying system 100, computing device 200 and/or mixing machine 300. Additionally, quality determination system 705 can communicate, via communication system 612, the determinations to various other components of architecture 600.

Figure 17:
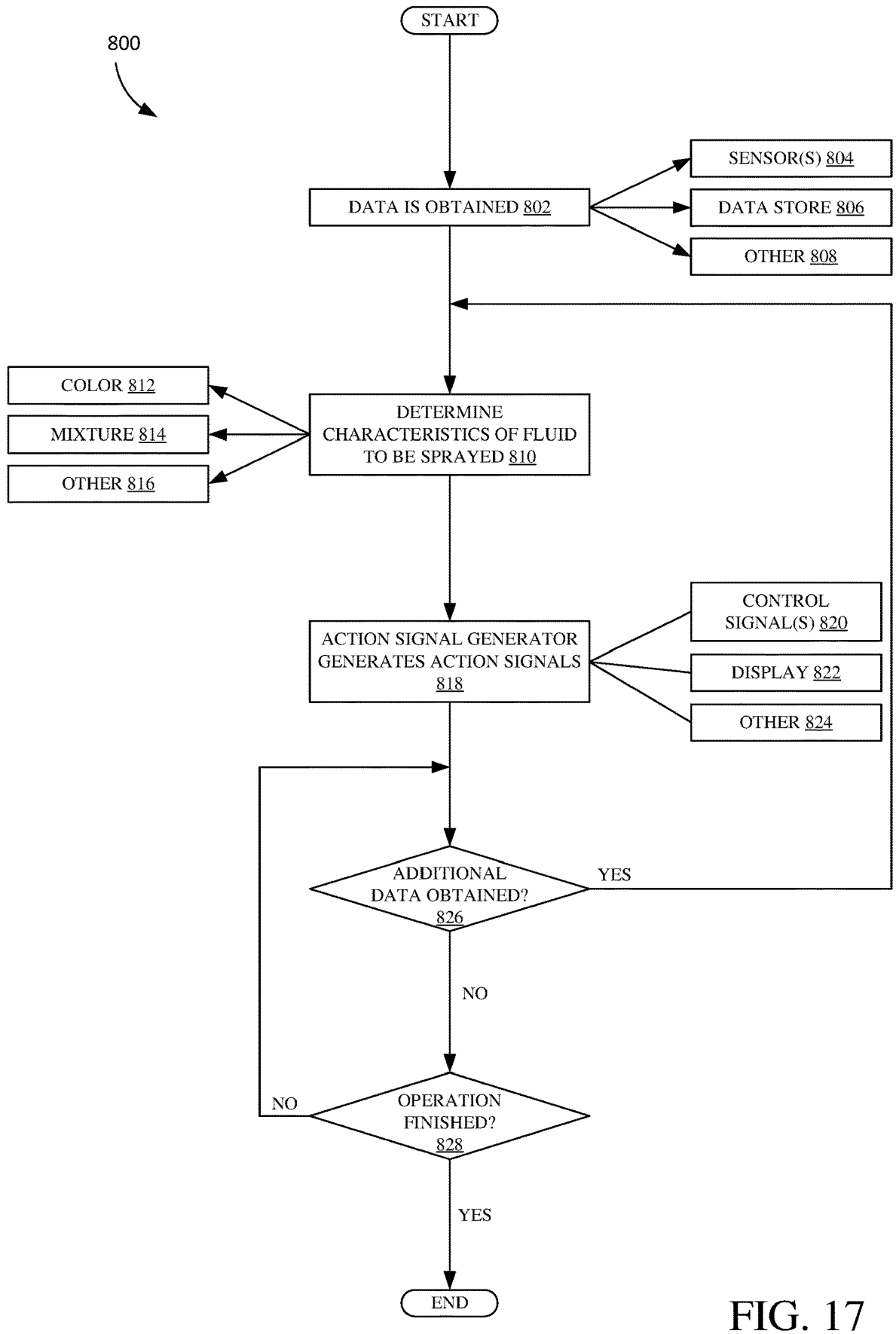
FIGS. 17-18 are flow diagrams showing example operations of a color matching system.
Figure 18:
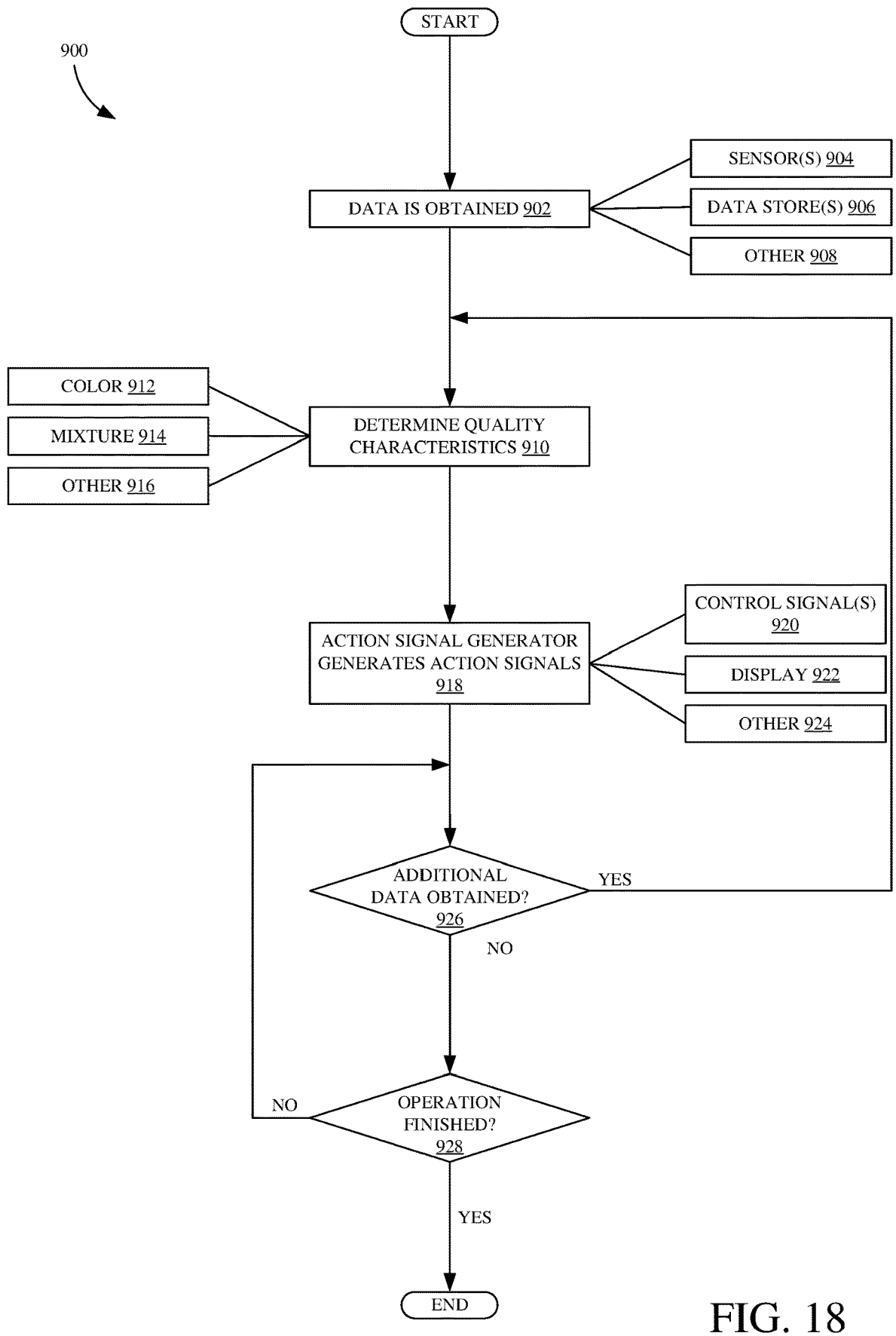

FIGS. 17-18 are flow diagrams showing example operations of a color matching system 624 illustrated in FIG. 16. The operation shown in FIG. 17 is one example of the operation of the system shown in FIG. 16 in determining characteristics relative to a fluid to be sprayed. It is to be understood that the operation can be carried out at any time or at any point throughout a spraying operation, or even if a spraying operation is not currently underway. Further, while the operation will be described in accordance with architecture 600 (e.g., spraying system 100, computing device 200, and/or mixing machine 300), it is to be understood that other architectures, systems, devices, machines, etc. with a color matching system 624 can be used as well.

Operation 800 begins at block 802 where data is obtained (e.g., received, accessed, etc.) by color matching system 624. Data (e.g., sensor data and/or values indicative of sensed variables, etc.) can be obtained from sensor(s) 602 as indicated by block 804. However, data can also be obtained from a variety of other sensors of other systems. Sensor data can include, for example, sensor data indicative of a color of a color matching surface. For instance, a captured image of a color matching surface by a color sensor, for example, a camera or other imaging/optical sensor, and/or color sensors 150 and/or 210. Data can be obtained from data store 606 as indicated by block 806. However, data can also be obtained from a variety of other data stores of other systems. Data from a data store can include, for example, determined and/or preprogrammed fluid colors, determined and/or preprogrammed fluid mixture requirements, saved user inputs, as well as a variety of other data in a data store relative to characteristics of a fluid to be sprayed. Data can also be obtained from a variety of other sources as indicated by block 808. Other data 808 can include, but is not limited to, user inputs indicative of a color and/or a mixture of a fluid to be sprayed.

Upon obtaining data, processing turns to block 810 where characteristics relative to a fluid to be sprayed are determined or otherwise detected. In one example, color matching system 624 (e.g., color determination system 700) can obtain the data and can determine/detect a color of a fluid to be sprayed (e.g., determine/detect a color of a color matching surface) as indicated by block 812. In another example, color matching system 624 (e.g., fluid mixture system 702) can obtain data and can determine/detect mixture requirements for a fluid to be sprayed (e.g., determine a ratio, flow rate, volume of fluids to, for instance, generate [e.g., mix] a fluid having a determined color) as indicated by block 814. In another example, color matching system 624 can obtain the data and can determine/detect a number of other characteristics relative to a fluid to be sprayed as indicated by block 816.

Upon determining/detecting characteristics relative to a fluid to be sprayed, processing proceeds to block 818 where control/action signal generator 710 generates an action signal. In one example, action signals can be used to control characteristics, parameters, etc., of architecture 600 (e.g., spraying system 100, computing device 200, mixing machine 300), including subsystems thereof as indicated by block 820, to generate user interface display(s) (or other indication(s)/recommendation(s), such as an alert) as indicated by block 822, or in other ways as indicated by block 824.

Control signals can be used, for example, to control fluid pathway 175 (e.g., activate, adjust, etc., metering elements 176), sensor(s) 602 (e.g., adjust lighting, viewing angle, etc.), fluid conveyance 608 (e.g., activate, adjust, etc. motor(s) 636, pump(s) 638, pressure vessel(s) 640, etc.). In one example, based on a color and/or mixture requirement determined by color matching system 624, a control signal can be generated to control the flow of fluids from fluid sources such that a fluid with a desired color is generated for spraying. A variety of other control signals can be generated to control components of architecture 600 in a variety of ways.

A user interface display can be generated on, for example, display 114, display 202 and/or display 302, as well as other interfaces, and can indicate a variety of information, for instance, but not limited to information relative to a mixture of fluid, characteristics relative to a color of fluid, current operating information (e.g. battery life, distance from a surface, orientation of spraying system 100, amount of fluid left, etc.), recommendations, indications, alerts, as well as numerous other information. However, other user interface displays can be generated as well.

Processing then turns to block 826 where it is determined whether additional data has been received by color matching system 624. If, at block 826, it is determined that additional data has been received, processing proceeds at block 810 where characteristics relative to a fluid to be sprayed are determined. If, however, it is determined that additional data has not been obtained, processing turns to block 828, where it is determined if operation of architecture 600 has finished. If, at block 828, it is determined that the operation has not finished, then processing proceeds at block 826 where it is determined if additional data has been obtained. If, however, it is determined that the operation has finished, then operation 800 ends.

The operation shown in FIG. 18 is one example of the operation of the system shown in FIG. 16 in determining a variety of quality characteristics and/or metrics relative to architecture 600 (e.g., spraying system 100, computing device 200 and/or mixing machine 300). It is to be understood that the operation can be carried out at any time or at any point throughout a spraying operation, or even if a spraying operation is not currently underway. Further, while the operation will be described in accordance with architecture 600, it is to be understood that other architectures, systems, devices, machines, etc. with a color matching system 624 can be used as well.

Operation 900 begins at block 902 where data is obtained (e.g., received, accessed, etc.) by color matching system 624. Data (e.g., sensor data and/or values indicative of sensed variables, etc.) can be obtained from sensor(s) 602 as indicated by block 904. However, data can also be obtained from a variety of other sensors of other systems. Sensor data can include, for example, sensor data indicative of a color of a fluid sprayed (e.g., on a surface). For instance, a captured image of a sprayed surface by a color sensor, for example, a camera or other imaging/optical sensor. In another example, sensor data can include, for example, sensor data indicative of an operating characteristic/parameter of architecture 600 (e.g., flow rate of fluid in fluid pathway 175, remaining fluid in fluid compartments 154 or fluid containers 159, remaining fluid in pressure vessel(s), etc.).

Data can be obtained from data store 606 as indicated by block 906. However, data can also be obtained from a variety of other data stores of other systems. Data from a data store can include, for example, determined and/or preprogrammed fluid colors, determined and/or preprogrammed fluid mixture requirements, saved user inputs, as well as a variety of other data in a data store relative to quality characteristics and/or metrics of a fluid to be sprayed.

Data can also be obtained from a variety of other sources as indicated by block 808. Other data can include, but is not limited to, user inputs.

Upon obtaining data, processing turns to block 910 where characteristics and/or metrics relative to architecture 600, including, but not limited to, quality characteristics and/or metrics relative to a fluid to be sprayed (or already sprayed). In one example, color matching system 624 (e.g., quality determination system 705) can obtain the data and can determine and/or detect quality characteristics and/or metrics relative to a color of fluid to be sprayed or already sprayed (e.g., determine/detect color of fluid sprayed on surface and, for instance, compare to the determined, preprogrammed, user selected color, etc.) as indicated by block 912. In another example, color matching system 624 (e.g., quality determination system 705) can obtain data and can determine/detect quality characteristics and/or metrics relative to a mixture of fluid (e.g., determine/detect the mixture [e.g., ratio, flow rate, volume of fluids, etc.] of the fluid sprayed and, for instance, compare to the determined, preprogrammed, user selected mixture requirements, etc.) as indicated by block 914. In another example, color matching system 624 can obtain the data and can determine/detect a number of other quality characteristics and/or metrics relative to a fluid to be sprayed (or already sprayed) as indicated by block 916.

Upon determining/detecting quality characteristics and/or metrics relative to a fluid to be sprayed (or already sprayed), processing proceeds to block 918 where control/action signal generator 710 generates an action signal. In one example, action signals can be used to control characteristics, parameters, etc. of architecture 600 (e.g., spraying system 100, computing device 200, mixing machine 300) including subsystems thereof as indicated by block 920, to generate user interface display(s) (or other indication(s)/recommendation(s), such as an alert) as indicated by block 922, or in other ways as indicated by block 924.

Control signals can be used, for example, to control fluid pathway 175 (e.g., activate, adjust, etc., metering elements 176), sensor(s) 602 (e.g., adjust lighting, viewing angle, etc.), fluid conveyance system 608 (e.g., activate, adjust, etc. motor(s) 636, pump(s) 638, pressure vessel(s) 640, etc.). In one example, based on determined/detected quality characteristics and/or metrics of a color and/or mixture of a fluid to be sprayed (or already sprayed), a control signal can be generated to control the flow of fluids from fluid sources. In some examples, the control signal is further based on a comparison to determined, preprogrammed, and/or user selected color and/or mixture requirements, etc.

A user interface display can be generated on, for example, display 114, display 202 and/or display 302, as well as other interfaces, and can indicate a variety of information, for instance, but not limited to, information relative to quality characteristics and/or metrics of a fluid to be sprayed (or already sprayed), current operating information (e.g., battery life, distance from surface, orientation of spraying system 100, amount of fluid left, etc.), recommendations (e.g., recommended mixture to compensate/correct quality), indications, alerts, as well as numerous other information. However, other user interface displays can be generated as well.

A variety of other actions signals can be generated at block 918, as indicated by block 924, including, but not limited to, action signals to store and/or update already stored information relative to a color and/or mixture of fluids in, for example, a data store (e.g., 606). For example, upon determining/detecting quality characteristics and/or metrics relative to a fluid to be sprayed (or already sprayed) color matching system 624 (e.g., quality determination system 705) can update (e.g., calibrate) information relative to determined, preprogrammed, user selected information relative to, for example, color and/or mixture requirements of a fluid to be sprayed. In this way, colors and/or mixtures of fluids can be dynamically updated and can be calibrated for a variety of different working environments, characteristics, etc.

Processing then turns to block 926 where it is determined whether additional data has been received by color matching system 624. If, at block 926, it is determined that additional data has been received, processing proceeds at block 910 where quality characteristics and/or metrics relative to a fluid to be sprayed (or already sprayed) are determined. If, however, it is determined that additional data has not been obtained, processing turns to block 928, where it is determined if operation of architecture 600 has finished. If, at block 928, it is determined that the operation has not finished, then processing proceeds at block 926 where it is determined if additional data has been obtained. If, however, it is determined that the operation has finished, then operation 900 ends.

It will be noted that the above discussion has described a variety of different systems, components and/or logic. It will be appreciated that such systems, components and/or logic can be comprised of hardware items (such as processors and associated memory, or other processing components, some of which are herein) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one example, the processors and servers include computer processors with associated memory and timing circuitry, not separately shown. They are functional parts of the systems or devices to which they belong and are activated by and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

Also, the figures show a number of blocks with functionality ascribed to each block. It will be noted that fewer blocks can be used so the functionality is performed by fewer components. Also, more blocks can be used with the functionality distributed among more components.

Figure 19:
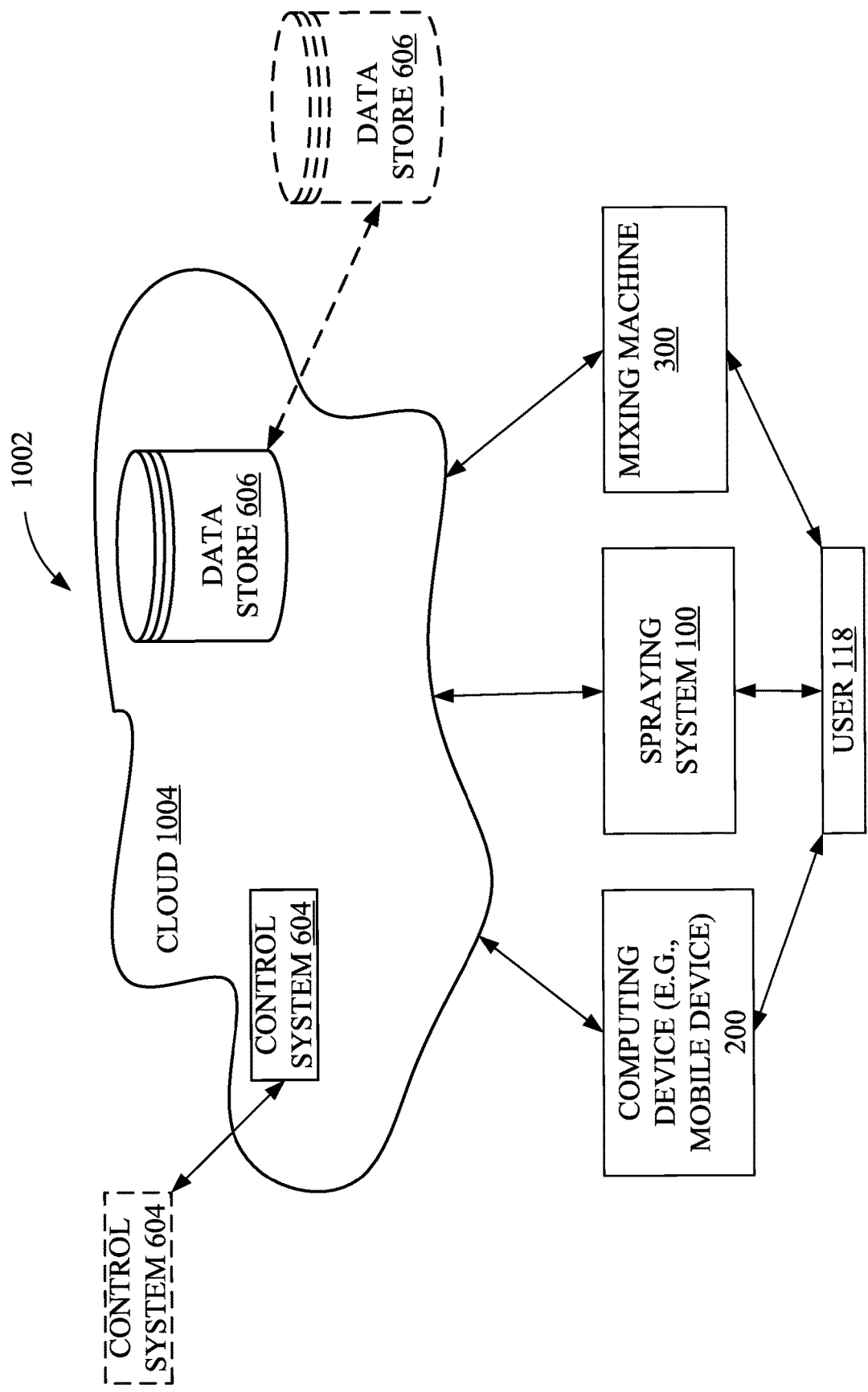
FIG. 19 is a block diagram showing the architecture illustrated in FIG. 15 deployed in a remote server computing environment.

FIG. 19 is a block diagram of one example of architecture 600, shown in FIG. 15, where spraying system 100, computing device 200, and mixing machine 300 communicate with elements in a remote server architecture 1002. In an example, remote server architecture 1002 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in FIG. 15 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 19 some items are similar to those shown in FIG. 15 and they are similarly numbered. FIG. 19 specifically shows that control system 604 (including color matching 624) and/or data store 606 can be located at a remote server location 1004, illustratively shown in FIG. 19 as a cloud server, though other remote server locations are also contemplated herein. Therefore, spraying system 100, computing device 200, and/or mixing machine 300 access those systems through remote server location 1004.

FIG. 19 also depicts another example of a remote server architecture. FIG. 19 shows that it is also contemplated that some elements of FIG. 15 are disposed at remote server location 1004 while others are not. By way of example, data store 606 can be disposed at a location separate from location 1004 and accessed through the remote server at location 1004. Alternatively, or in addition, control system 604 can be disposed at location(s) separate from location 1004 and accessed through the remote server at location 1004.

Regardless of where they are located, they can be accessed directly by spraying system 100, computing device 200 and/or mixing machine 300, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another system, device and/or machine can have an automated information collection system. The collected information can then be forwarded to the main network as the other system, device and/or machine reaches a location where there is cellular coverage (or other wireless coverage). All of these architectures are contemplated herein. Further, the information can be stored on the spraying system, computing device and/or mixing machine until the spraying system, computing device, and/or mixing machine enters a covered location. The spraying system, computing device, mixing machine, themselves, can then send and receive the information to/from the main network.

Figure 20:
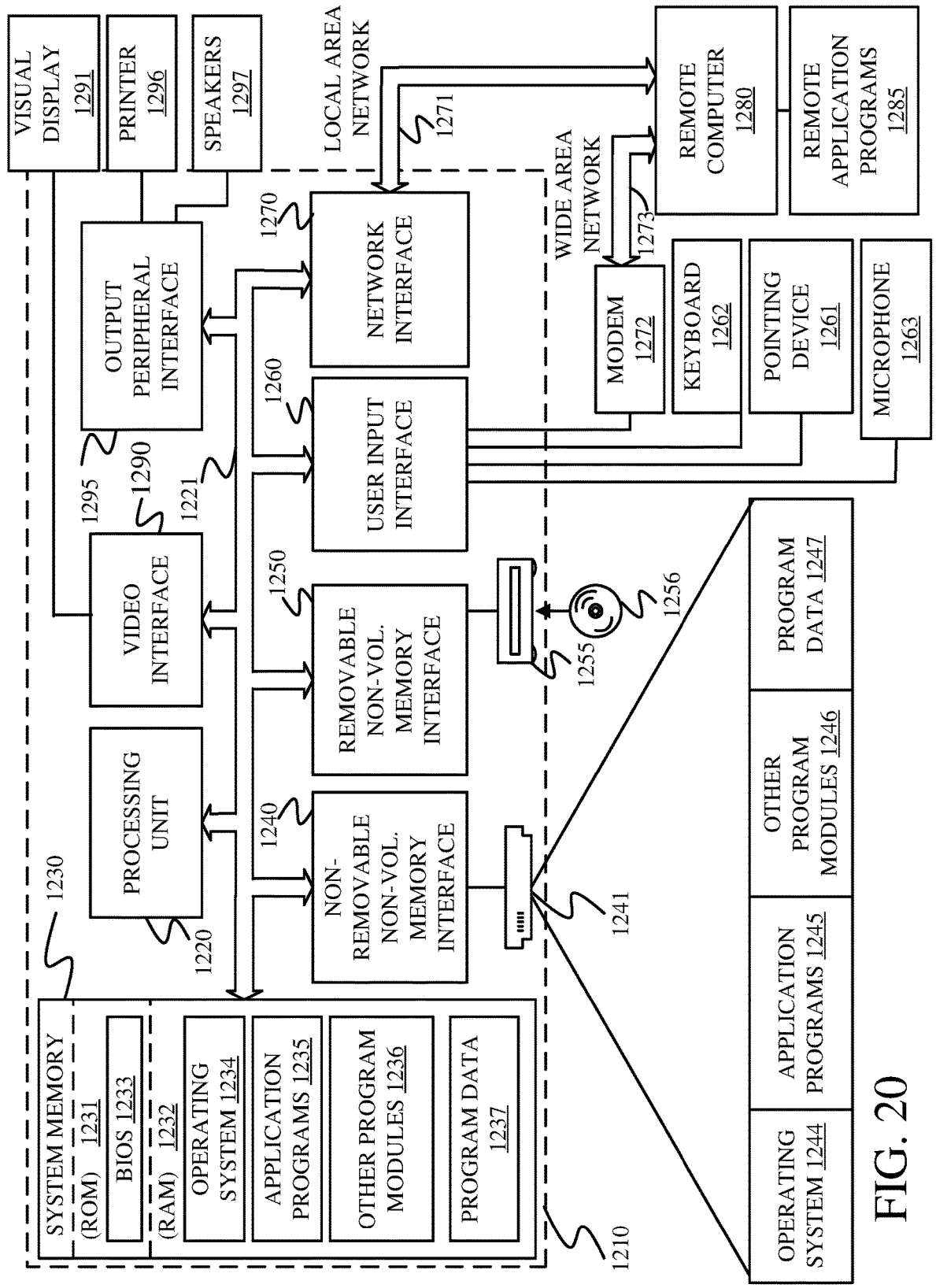
FIG. 20 is a block diagram showing one example of a computing environment that can be used in the architecture illustrated in previous FIGS.

FIG. 20 is one example of a computing environment in which elements of FIG. 15, or parts of it, (for example) can be deployed. With reference to FIG. 20, an example system for implementing some embodiments includes a computing device in the form of a computer 1210. Components of computer 1210 may include, but are not limited to, a processing unit 1220 (which can comprise processors or servers from previous FIGS.), a system memory 1230, and a system bus 1221 that couples various system components including the system memory to the processing unit 1220. The system bus 1221 may be any of several types of bus structures including a memory bus or memory controller, a peripheral bus, and a local bus using any of a variety of bus architectures. Memory and programs described with respect to FIG. 15 can be deployed in corresponding portions of FIG. 20.

Computer 1210 typically includes a variety of computer readable media. Computer readable media can be any available media that can be accessed by computer 1210 and includes both volatile and nonvolatile media, removable and non-removable media. By way of example, and not limitation, computer readable media may comprise computer storage media and communication media. Computer storage media is different from, and does not include a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1210. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 1230 includes computer storage media in the form of volatile and/or nonvolatile memory such as read only memory (ROM) 1231 and random access memory (RAM) 1232. A basic input/output system 1233 (BIOS), containing the basic routines that help to transfer information between elements within computer 1210, such as during start-up, is typically stored in ROM 1231. RAM 1232 typically contains data and/or program modules that are immediately accessible to and/or presently being operated on by processing unit 1220. By way of example, and not limitation, FIG. 20 illustrates operating system 1234, application programs 1235, other program modules 1236, and program data 1237.

The computer 1210 may also include other removable/non-removable volatile/nonvolatile computer storage media. By way of example only, FIG. 20 illustrates a hard disk drive 1241 that reads from or writes to non-removable, nonvolatile magnetic media, an optical disk drive 1255, and nonvolatile optical disk 1256. The hard disk drive 1241 is typically connected to the system bus 1221 through a non-removable memory interface such as interface 1240, and optical disk drive 1255 is typically connected to the system bus 1221 by a removable memory interface, such as interface 1250.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 20, provide storage of computer readable instructions, data structures, program modules and other data for the computer 1210. In FIG. 20, for example, hard disk drive 1241 is illustrated as storing operating system 1244, application programs 1245, other program modules 1246, and program data 1247. Note that these components can either be the same as or different from operating system 1234, application programs 1235, other program modules 1236, and program data 1237.

A user may enter commands and information into the computer 1210 through input devices such as a keyboard 1262, a microphone 1263, and a pointing device 1261, such as a mouse, trackball or touch pad. Other input devices (not shown) may include a joystick, game pad, satellite dish, scanner, or the like. These and other input devices are often connected to the processing unit 1220 through a user input interface 1260 that is coupled to the system bus, but may be connected by other interface and bus structures. A visual display 1291 or other type of display device is also connected to the system bus 1221 via an interface, such as a video interface 1290. In addition to the monitor, computers may also include other peripheral output devices such as speakers 1297 and printer 1296, which may be connected through an output peripheral interface 1295.

The computer 1210 is operated in a networked environment using logical connections (such as a local area network—LAN, or wide area network—WAN or a controller area network—CAN) to one or more remote computers, such as a remote computer 1280.

When use in a LAN networking environment, the computer 1210 is connected to the LAN 1271 through a network interface or adapter 1270. When used in a WAN networking environment, the computer 1210 typically includes a modem 1272 or other means for establishing communications over the WAN 1273, such as the Internet. In a networked environment, program modules may be stored in a remote memory storage device. FIG. 20 illustrates, for example, that remote application programs 1285 can reside on remote computer 1280.

At least some examples are described herein in the context of applying a coating material, such as paint, to a surface. As used herein, "paint" includes substances composed of coloring matter or pigment suspending in a liquid medium as well as substances that are free of coloring matter or pigment. "Paint" can also include preparatory coatings, such as primers. "Paint" can be applied to coat a surface as a liquid or a gaseous suspension, for example, and the coating provided can be opaque, transparent, or semi-transparent. Some particular examples include, but are not limited to, latex paint, oil-based paint, stain, lacquers, varnish, inks, and the like.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A handheld portable airless paint spraying system comprising:
   a portable body;
   at least one battery;
   at least one paint source removably coupled to and carried on the portable body, the at least one paint source containing a plurality of paints, each paint, of the plurality of paints, having a different color than another paint in the at least one paint source;
   a spray tip;
   a paint pathway configured to carry the plurality of paints to the spray tip; operable to pressurize at least two paints, of the plurality of paints, to generate a pressurized flow along the paint pathway;
   a sensor retaining device;
   a removable color sensor removably received by the sensor retaining device, wherein, when received by the sensor retaining device, the removable color sensor is carried on the handheld portable airless paint spraying system;
   a wireless communication system that wirelessly receives, from the removable color sensor, a sensor signal indicative of a target color; and
   a control system powered by the at least one battery to receive the sensor signal indicative of the target color and to generate a control signal, based on the target color, to control a respective flow rate of each paint, of the at least two paints, along the paint pathway to generate a mixed paint sprayed from the spray tip, the mixed paint having a color resultant from a mixture of the at least two paints of the plurality of paints.

2. The handheld portable airless paint spraying system of claim 1, wherein the at least one paint source comprises a plurality of compartments, each respective compartment, of the plurality of compartments, is configured to separately contain therein a respective paint of the plurality of paints.

3. The handheld portable airless paint spraying system of claim 2, wherein the pressure source is configured to apply pressure to the plurality of compartments, the pressure source comprising at least one of a pump, a motor, or a pressure vessel.

4. The handheld portable airless paint spraying system of claim 1, wherein the at least one paint source comprises a plurality of collapsible paint containers configured to collapse in response to pressure generated by the pressure source, and each container, of the plurality of collapsible paint containers, contains a different paint of the plurality of paints.

5. The handheld portable airless paint spraying system of claim 4, wherein the pressure source comprises a pressure vessel containing a liquified gas and configured to apply a pressure, that is less than 3000 pounds per square inch (PSI), to one or more containers, of the plurality of collapsible paint containers, to cause the at least two paints to flow along the paint pathway.

6. The handheld portable airless paint spraying system of claim 5, wherein the pressure vessel comprises a replaceable carbon dioxide ($CO_2$) cannister containing liquified $CO_2$, and the pressure is more than 100 PSI.

7. The handheld portable airless paint spraying system of claim 6, wherein the pressure is between approximately 700-800 PSI.

8. The handheld portable airless paint spraying system of claim 1, wherein, when removed from the sensor retaining device, the removable color sensor is positionable to optically detect a surface that is external to the system, wherein the target color comprises a color on the surface.

9. The handheld portable airless paint spraying system of claim 1, wherein the sensor retaining device is positioned proximate a bottom of the handheld portable airless paint spraying system.

10. The handheld portable airless paint spraying system of claim 9, wherein the sensor retaining device includes a structure comprising one or more projections that extend at least partially over the removable color sensor when the removable color sensor is carried on the handheld portable airless paint spraying system.

11. The handheld portable airless paint spraying system of claim 9, wherein the sensor retaining device is positioned on a housing of the at least one paint source.

12. The handheld portable airless paint spraying system of claim 11, wherein the housing comprises a first mating feature and the sensor retaining device comprises a second mating feature configured to mate to the first mating feature.

13. The handheld portable airless paint spraying system of claim 12, wherein the first mating feature and the second mating feature each comprise corresponding threads.

14. The handheld portable airless paint spraying system of claim 11, wherein the sensor retaining device is positioned proximate a bottom of the housing of the at least one paint source.

15. A handheld airless spray gun comprising:
a coupler configured to fixedly couple a liquid source to the handheld airless spray gun, wherein the coupler is configured to support the liquid source such that the liquid source is carried on the handheld airless spray gun;
a spray tip;
a liquid pathway configured to carry a plurality of different liquids from the liquid source to the spray tip;
a pressure source disposed within the handheld airless spray gun and configured to pressurize at least two liquids, of the plurality of different liquids, to generate a pressurized flow along the liquid pathway;
a sensor retaining device;
a removable color sensor removably received by the sensor retaining device, wherein, when received by the sensor retaining device, the removable color sensor is carried on the handheld airless spray gun;
a wireless communication system that wirelessly receives, from the removable color sensor, a sensor signal indicative of a target color; and
a control system configured to receive the sensor signal indicative of the target color and to generate a control signal, based on the target color, to control a respective flow of each liquid, of the at least two liquids, along the liquid pathway to generate a mixed liquid sprayed from the spray tip, the mixed liquid having a resultant from a mixture of the at least two liquids.

16. The handheld airless spray gun of claim 15, wherein the control signal indicates a ratio at which each liquid, of the plurality of different liquids, is to flow along the liquid pathway.

17. The handheld airless spray gun of claim 16, wherein the plurality of different liquids comprises a plurality of differently colored paints, and the control signal indicates a color of paint to be sprayed by the handheld airless spray gun.

18. The handheld airless spray gun of claim 15 wherein the removable color sensor is configured to sense a surface and generate the sensor signal indicative of a color of the surface, wherein the control signal controls a flow of each liquid, of the plurality of different liquids, along the liquid pathway to generate a paint to be sprayed by the spray gun, based on the sensor signal indicative of the color of the surface.

19. The handheld airless spray gun of claim 15, wherein the pressure source is configured to generate a pressure sufficient to cause a plurality of collapsible liquid containers to collapse and cause the at least two liquids, of the plurality of different liquids, to flow along the liquid pathway.

20. The handheld airless spray gun of claim 19, wherein the pressure source comprises a replaceable carbon dioxide ($CO_2$) cannister containing liquified $CO_2$, the replaceable $CO_2$ cannister configured to apply a pressure of approximately 700-800 (pounds per square inch (PSI) to at least one container, of the plurality of collapsible liquid containers.

21. The handheld airless spray gun of claim 15, and further comprising at least one battery.

22. The handheld portable airless paint spraying system of claim 15, wherein the sensor retaining device is positioned proximate a bottom of the handheld airless spray gun.

* * * * *